(12) United States Patent
Takano

(10) Patent No.: US 10,721,048 B2
(45) Date of Patent: Jul. 21, 2020

(54) APPARATUS AND METHOD

(71) Applicant: SONY CORPORATION, Tokyo (JP)

(72) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/352,865

(22) Filed: Mar. 14, 2019

(65) Prior Publication Data

US 2019/0215134 A1 Jul. 11, 2019

Related U.S. Application Data

(63) Continuation of application No. 15/527,734, filed as application No. PCT/JP2015/084945 on Dec. 14, 2015, now Pat. No. 10,498,518.

(30) Foreign Application Priority Data

Jan. 29, 2015 (JP) ................. 2015-015818

(51) Int. Cl.
*H04J 3/00* (2006.01)
*H04L 5/00* (2006.01)
(Continued)

(52) U.S. Cl.
CPC ........... *H04L 5/0073* (2013.01); *H04B 7/024* (2013.01); *H04L 5/0032* (2013.01); *H04W 16/28* (2013.01);
(Continued)

(58) Field of Classification Search
CPC ........... H04W 72/0446; H04W 72/042; H04W 72/0413; H04W 84/12; H04L 5/0055
See application file for complete search history.

(56) References Cited

U.S. PATENT DOCUMENTS

2007/0243878 A1 10/2007 Taira et al.
2009/0131065 A1 5/2009 Khandekar et al.
(Continued)

FOREIGN PATENT DOCUMENTS

EP 2426971 A1 3/2012
EP 2549814 A1 1/2013
(Continued)

OTHER PUBLICATIONS

Japanese Office Action dated Feb. 12, 2019, issued in corresponding Japanese Patent Application No. 2016-571810.
(Continued)

*Primary Examiner* — Atique Ahmed
(74) *Attorney, Agent, or Firm* — Xsensus LLP

(57) ABSTRACT

[Object] To enable interference of directional beams between cells to further decrease.

[Solution] Provided is an apparatus including: an acquisition unit that acquires information about a directional beam that is provided from a neighbor base station of a base station, the directional beam serving as an interference source for a terminal apparatus connected to the neighbor base station among a plurality of directional beams which is able to be formed by the base station; and a control unit that decides an operation of the base station regarding transmission of a signal over the directional beam on the basis of the information.

5 Claims, 16 Drawing Sheets

(51) Int. Cl.
*H04W 16/28* (2009.01)
*H04W 24/10* (2009.01)
*H04W 72/04* (2009.01)
*H04B 7/024* (2017.01)
*H04B 7/0452* (2017.01)
*H04W 72/08* (2009.01)

(52) U.S. Cl.
CPC ........... *H04W 24/10* (2013.01); *H04W 72/04* (2013.01); *H04W 72/0446* (2013.01); *H04B 7/0452* (2013.01); *H04W 72/082* (2013.01)

(56) References Cited

U.S. PATENT DOCUMENTS

| | | | |
|---|---|---|---|
| 2010/0279619 A1 | 11/2010 | Yeh et al. | |
| 2010/0291940 A1* | 11/2010 | Koo | H04B 7/024 455/450 |
| 2011/0085448 A1 | 4/2011 | Kuwahara | |
| 2011/0280330 A1 | 11/2011 | Tanaka | |
| 2011/0281600 A1 | 11/2011 | Tanaka | |
| 2012/0076040 A1* | 3/2012 | Hoshino | H04W 24/10 370/252 |
| 2012/0082052 A1* | 4/2012 | Oteri | H04W 24/10 370/252 |
| 2012/0155341 A1 | 6/2012 | Yamamoto et al. | |
| 2012/0202477 A1 | 8/2012 | Eriksson | |
| 2012/0275530 A1* | 11/2012 | Nazar | H04B 7/022 375/267 |
| 2012/0287875 A1* | 11/2012 | Kim | H04B 7/024 370/329 |
| 2013/0115999 A1* | 5/2013 | Sirotkin | H04B 7/0617 455/522 |
| 2013/0196675 A1* | 8/2013 | Xiao | H04B 17/24 455/452.1 |
| 2014/0024388 A1* | 1/2014 | Earnshaw | H04W 72/02 455/452.2 |
| 2014/0029458 A1* | 1/2014 | Ye | H04W 24/10 370/252 |
| 2014/0078919 A1 | 3/2014 | Hammarwall | |
| 2014/0133333 A1 | 5/2014 | Liu et al. | |
| 2015/0016434 A1 | 1/2015 | Luo et al. | |
| 2015/0215856 A1* | 7/2015 | Kim | H04W 48/16 370/252 |
| 2015/0222340 A1 | 8/2015 | Nagata et al. | |
| 2015/0249517 A1* | 9/2015 | Seo | H04W 16/10 370/329 |
| 2015/0282036 A1* | 10/2015 | Yi | H04L 5/001 370/332 |
| 2015/0341097 A1 | 11/2015 | Yang et al. | |
| 2015/0373732 A1 | 12/2015 | Davydov et al. | |
| 2017/0006613 A1* | 1/2017 | Kakishima | H04B 7/0413 |
| 2017/0230969 A1* | 8/2017 | Aldana | H04W 4/70 |

FOREIGN PATENT DOCUMENTS

| | | |
|---|---|---|
| EP | 2824984 A1 | 1/2015 |
| JP | 2010-171733 A | 8/2010 |
| JP | 2013-153333 A | 8/2013 |
| JP | 2014-53811 A | 3/2014 |
| JP | 2014-064294 A | 4/2014 |
| JP | 2014-204305 A | 10/2014 |
| JP | 2014-204306 A | 10/2014 |
| JP | 2015-518677 A | 7/2015 |
| JP | 2015-185956 A | 10/2015 |
| WO | 2013/111455 A1 | 8/2013 |
| WO | 2014/034679 A1 | 3/2014 |

OTHER PUBLICATIONS

European Search Report dated Aug. 9, 2018, issued in corresponding European Patent Application No. 15880143.
International Search Report dated Jan. 19, 2016 in PCT/JP2015/084945 filed Dec. 14, 2015.
Office Action dated Jun. 25, 2019, issued in corresponding Japanese Application No. 2016-571810, 10 pages (with English translation).
Alcatel-Lucent Shanghai Bell, Alcatel-Lucent, Performance of Rel 12 AAS for 3D UMa and 3D UMi Scenarios, 3GPP TSG RAN WG1 Meeting # 79, R1-144706—San Francisco, USA Nov. 17-21, 2014, 6 pages.
Alcatel-Lucent Shanghai Bell, Alcatel-Lucent, Performance of Rel 12 AAS for 3D UMa and 3D UMi scenarios [online], 3GPP TSG-RAN WG1#79 R1-144706, Internet <URL:http://www.3gpp.org/ftp/tsg_ran/WG1_RL1/TSGR1_79/Docs/R1-144706.zip>, Nov. 21, 2014.
Japanese Decision to Dismiss the Amendment dated Nov. 26, 2019, in corresponding Japanese Patent Application No. 2016-571810.
Japanese Decision of Refusal dated Nov. 26, 2019, in corresponding Japanese Patent Application No. 2016-571810.

* cited by examiner

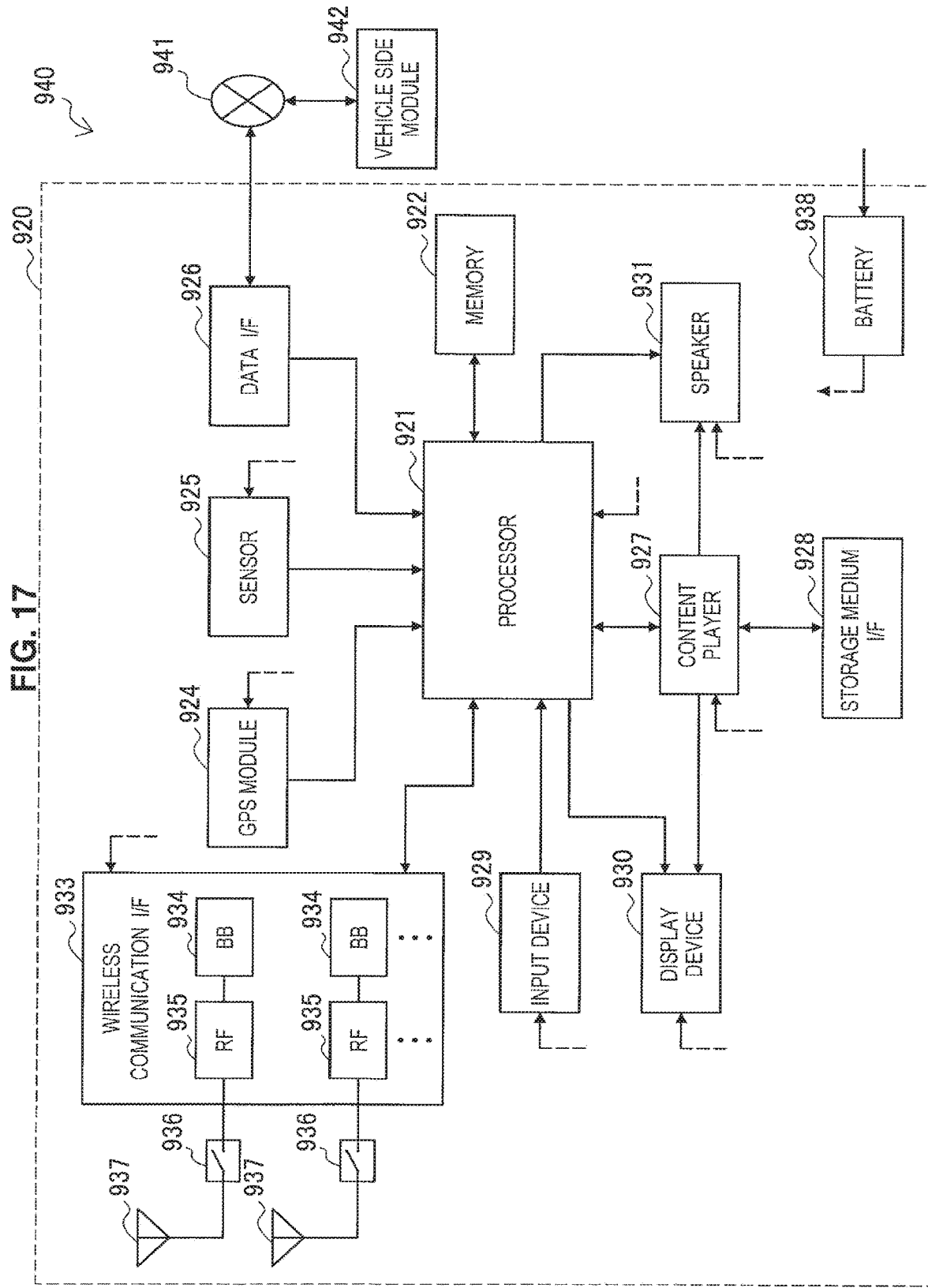

APPARATUS AND METHOD

CROSS-REFERENCE TO RELATED APPLICATIONS

The present application is a continuation of U.S. patent application Ser. No. 15/527,734, filed May 18, 2017, which is based on PCT filing PCT/JP2015/084945, filed Dec. 14, 2015, which claims priority to JP 2015-015818, filed Jan. 29, 2015, the entire contents of which are incorporated herein by reference.

TECHNICAL FIELD

The present disclosure relates to apparatuses and methods.

BACKGROUND ART

In the Third Generation Partnership Project (3GPP), various techniques for improving the capacity of a cellular system are currently studied in order to accommodate explosively increasing traffic. It is also envisaged that the required capacity will become about 1000 times the current capacity in the future. Techniques such as multi-user multi-input multiple-input multiple-output (MU-MIMO), coordinated multipoint (CoMP), and the like could increase the capacity of a cellular system by a factor of as low as less than ten. Therefore, there is a demand for an innovative technique.

For example, as a technique for significantly increasing the capacity of a cellular system, a base station may perform beamforming using a directional antenna including a large number of antenna elements (e.g., about 100 antenna elements). Such a technique is a kind of technique called large-scale MIMO or massive MIMO. By such beamforming, the half-width of a beam is narrowed. In other words, a sharp beam is formed. Also, if the large number of antenna elements are arranged in a plane, a beam aimed in a desired three-dimensional direction can be formed.

For example, Patent Literatures 1 to 3 disclose techniques applied when a directional beam aimed in a three-dimensional direction is used.

CITATION LIST

Patent Literature

Patent Literature 1: JP 2014-204305A
Patent Literature 2: JP 2014-53811A
Patent Literature 3: JP 2014-64294A

DISCLOSURE OF INVENTION

Technical Problem

For example, when a base station performs beamforming, directional beams formed by the base station may reach a neighbor cell. Particularly, directional beams of large-scale MIMO may reach a neighbor cell and cause high received power. Consequently, large interference may be generated.

Accordingly, it is desirable to provide a system which enables interference of directional beams between cells to further decrease.

Solution to Problem

According to the present disclosure, there is provided an apparatus including: an acquisition unit that acquires information about a directional beam that is provided from a neighbor base station of a base station, the directional beam serving as an interference source for a terminal apparatus connected to the neighbor base station among a plurality of directional beams which is able to be formed by the base station; and a control unit that decides an operation of the base station regarding transmission of a signal over the directional beam on the basis of the information.

In addition, according to the present disclosure, there is provided a method including, by a processor: acquiring information about a directional beam that is provided from a neighbor base station of a base station, the directional beam serving as an interference source for a terminal apparatus connected to the neighbor base station among a plurality of directional beams which is able to be formed by the base station; and deciding an operation of the base station regarding transmission of a signal over the directional beam on the basis of the information.

In addition, according to the present disclosure, there is provided an apparatus including: a calculation unit that calculates an amount of interference from a reference signal for channel quality measurement transmitted by a neighbor base station of a serving base station; a detection unit that detects a radio resource having a small amount of interference from among radio resources to which the reference signal is transmitted; and a reporting unit that reports the radio resource having a small amount of interference to a base station.

Advantageous Effects of Invention

As described above, according to the present disclosure, it is possible to further decrease interference of directional beams between cells. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 17 is a block diagram illustrating an example of a schematic configuration of a car navigation apparatus.

MODE(S) FOR CARRYING OUT THE INVENTION

Figure 1:
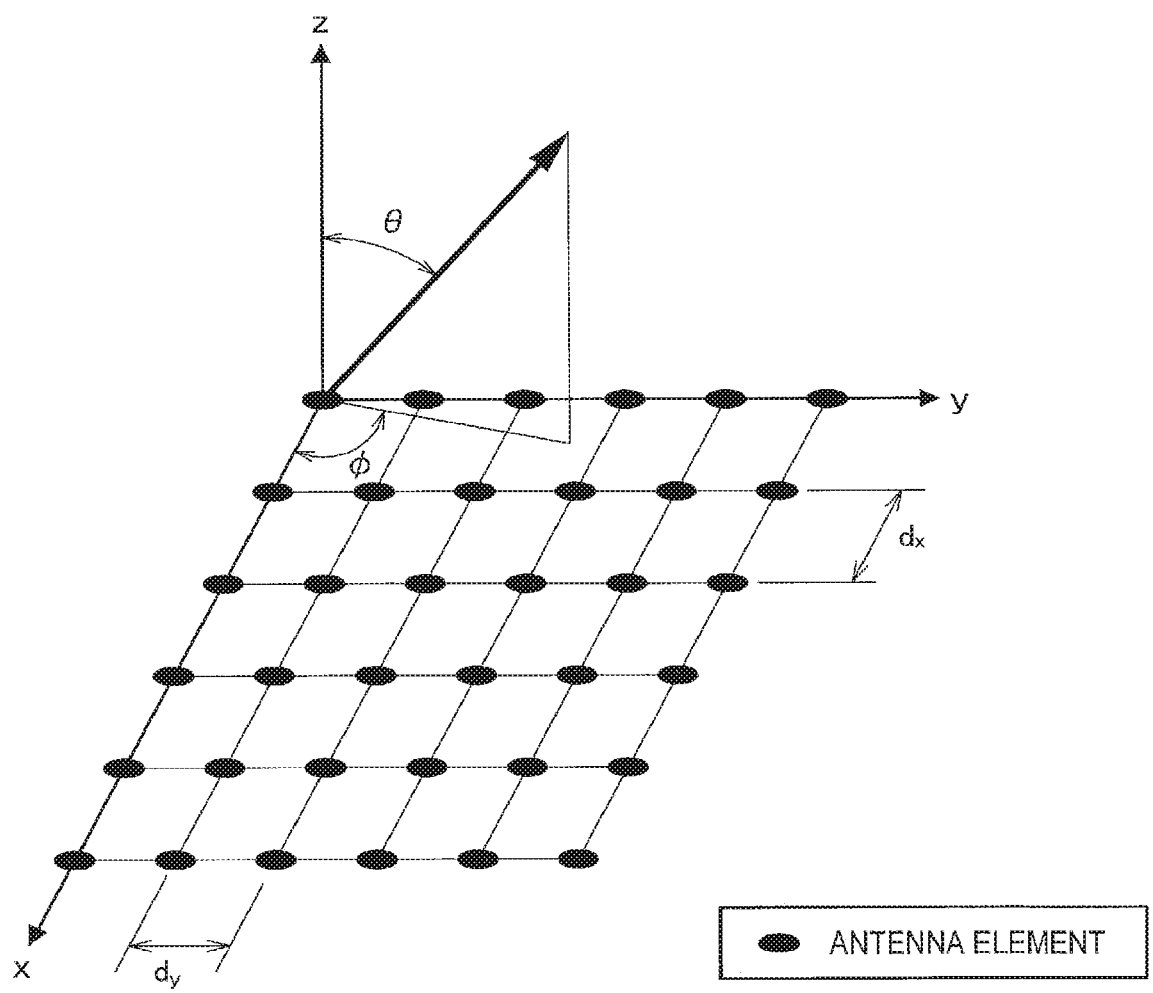
FIG. 1 is a diagram for describing a weight set for large-scale MIMO beamforming.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In addition, there are cases in the present specification and the diagrams in which constituent elements having substantially the same functional configuration are distinguished from each other by affixing different letters to the same reference numbers. For example, a plurality of constituent elements having substantially the same functional configuration are distinguished, like terminal apparatuses 200A, 200B, and 200C, if necessary. However, when there is no particular need to distinguish a plurality of constituent elements having substantially the same functional configuration from each other, only the same reference number is affixed thereto. For example, when there is no particular need to distinguish terminal apparatuses 200A, 200B, and 200C, they are referred to simply as terminal apparatuses 200.

Description will be given in the following order.
1. Introduction
1.1. Related techniques
1.2. Consideration related to present embodiment
2. Schematic configuration of system
3. Configuration of each apparatus
3.1. Configuration of base station
3.2. Configuration of terminal apparatus
4. Technical features
5. Processing flow
6. Application examples
6.1. Application examples related to base station
6.2. Application examples related to terminal apparatus
7. Conclusion 1. Introduction First of all, techniques related to an embodiment of the present disclosure and consideration related to the present embodiment will be described with reference to FIGS. 1 to 7.

1.1. Related Techniques

Beamforming and measurement will be described as techniques related to an embodiment of the present disclosure with reference to FIGS. 1 to 4.

(1) Beamforming (a) Necessity of Large-Scale MIMO

In the 3GPP, various techniques for improving the capacity of a cellular system are currently studied in order to accommodate explosively increasing traffic. It is envisaged that the required capacity will become about 1000 times the current capacity in the future. Techniques such as MU-MIMO, CoMP, and the like could increase the capacity of a cellular system by a factor of as low as less than ten. Therefore, there is a demand for an innovative technique.

Release 10 of the 3GPP specifies that eNode B is equipped with eight antennas. Therefore, the antennas can provide eight-layer MIMO in the case of single-user multi-input multiple-input multiple-output (SU-MIMO). Eight-layer MIMO is a technique of spatially multiplexing eight separate streams. Alternatively, the antennas can provide four-user two-layer MU-MIMO.

User equipment (UE) has only a small space for accommodating an antenna, and limited processing capability, and therefore, it is difficult to increase the number of antenna elements in the antenna of UE. However, recent advances in antenna mounting technology have allowed eNnode B to accommodate a directional antenna including about 100 antenna elements.

For example, as a technique for significantly increasing the capacity of a cellular system, a base station may perform beamforming using a directional antenna including a large number of antenna elements (e.g., about 100 antenna elements). Such a technique is a kind of technique called large-scale MIMO or massive MIMO. By such beamforming, the half-width of a beam is narrowed. In other words, a sharp beam is formed. Also, if the large number of antenna elements are arranged in a plane, a beam aimed in a desired three-dimensional direction can be formed. For example, it has been proposed that, by forming a beam aimed at a higher position than that of a base station (e.g., a higher floor of a high-rise building), a signal is transmitted to a terminal apparatus located at that position.

In typical beamforming, the direction of a beam can be changed in the horizontal direction. Therefore, it can be said that the typical beamforming is two-dimensional beamforming. Meanwhile, in large-scale MIMO (or massive MIMO) beamforming, the direction of a beam can be changed in the vertical direction as well as the horizontal direction. Therefore, it can be said that large-scale MIMO beamforming is three-dimensional beamforming.

Note that the increase in the number of antennas allows for an increase in the number of MU-MIMO users. Such a technique is another form of the technique called large-scale MIMO or massive MIMO. Note that when the number of antennas in UE is two, the number of spatially separated streams is two for a single piece of UE, and therefore, it is more reasonable to increase the number of MU-MIMO users than to increase the number of streams for a single piece of UE.

(b) Weight Set

A set of weight for beamforming are represented by a complex number (i.e., a set of weight coefficients for a plurality of antenna elements). An example of a weight set particularly for large-scale MIMO beamforming will now be described with reference to FIG. 1.

FIG. 1 is a diagram for describing a weight set for large-scale MIMO beamforming. FIG. 1 shows antenna elements arranged in a grid pattern. FIG. 1 also shows two orthogonal axes x and y in a plane in which the antenna elements are arranged, and an axis z perpendicular to the plane. Here, the direction of a beam to be formed is, for example, represented by an angle phi (Greek letter) and an angle theta (Greek letter). The angle phi (Greek letter) is an angle between an xy-plane component of the direction of a beam and the x-axis. Also, the angle theta (Greek letter) is an angle between the beam direction and the z-axis. In this case, for example, the weight coefficient $V_{m,n}$ of an antenna element which is m-th in the x-axis direction and n-th in the y-axis direction is represented as follows.

$$V_{m,n}(\theta, \varphi, f) = \exp\left(j2\pi \frac{f}{c}\{(m-1)d_x\sin(\theta)\cos(\varphi) + (n-1)d_y\sin(\theta)\sin(\varphi)\}\right)$$ [Math. 1]

In formula (1), f is a frequency, and c is the speed of light. Also, j is the imaginary unit of a complex number. Also, $d_x$ is an interval between each antenna element in the x-axis direction, and $d_y$ is an interval between each antenna element in the y-axis direction. Note that the coordinates of an antenna element are represented as follows.

$$x=(m-1)d_x, \ y=(n-1)d_y$$ [Math. 2]

A weight set for typical beamforming (two-dimensional beamforming) may be divided into a weight set for acquiring directivity in the horizontal direction and a weight set for phase adjustment of dual layer MIMO (i.e., a weight set for phase adjustment between two antenna subarrays corresponding to different polarized waves). On the other hand, a weight set for beamforming of large-scale MIMO (three-dimensional beamforming) may be divided into a first weight set for acquiring directivity in the horizontal direction, a second weight set for acquiring directivity in the vertical direction, and a third weight set for phase adjustment of dual layer MIMO.

(c) Change in Environment Due to Large-Scale MIMO Beamforming

When large-scale MIMO beamforming is performed, the gain reaches 10 dB or more. In a cellular system employing the above beamforming, a significant change in radio wave environment may occur compared to a conventional cellular system.

(d) Case where Large-Scale MIMO Beamforming is Performed

For example, a base station in urban areas may form a beam aimed at a high-rise building. Also, even in rural areas, a base station of a small cell may form a beam aimed at an area around the base station. Note that it is highly likely that a base station of a macro-cell in rural areas does not perform large-scale MIMO beamforming.

Figure 2:
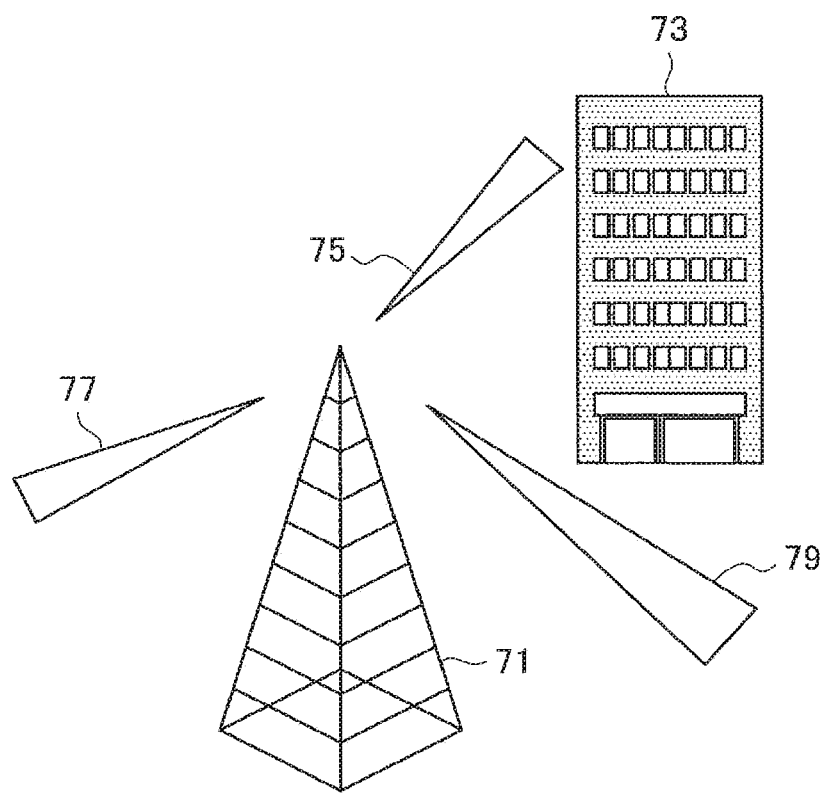
FIG. 2 is a diagram for describing an example of a case in which beamforming of large-scale MIMO is performed.

FIG. 2 is a diagram for describing an example of a case in which beamforming of large-scale MIMO is performed. Referring to FIG. 2, a base station 71 and a high-rise building 73 are illustrated. For example, the base station 71 forms a directional beam 79 toward the high-rise building 73 in addition to directional beams 75 and 77 toward the ground.

(2) Measurement

Measurement includes measurement for selecting a cell and measurement for feeding back a channel quality indicator (CQI) and the like after connection. The latter is required to be performed in a shorter time. Measurement of an amount of interference from a neighbor cell as well as measurement of quality of a serving cell may be considered as a kind of such CQI measurement.

(a) CQI Measurement

Although a cell-specific reference signal (CRS) may be used for CQI measurement, a channel state information reference signal (CSI-RS) has mainly been used for CQI measurement since release 10.

A CSI-RS is transmitted without beamforming, similar to a CRS. That is, the CSI-RS is transmitted without being multiplied by a weight set for beamforming, similar to a CRS. A specific example of this will be described with reference to FIG. 3.

Figure 3:
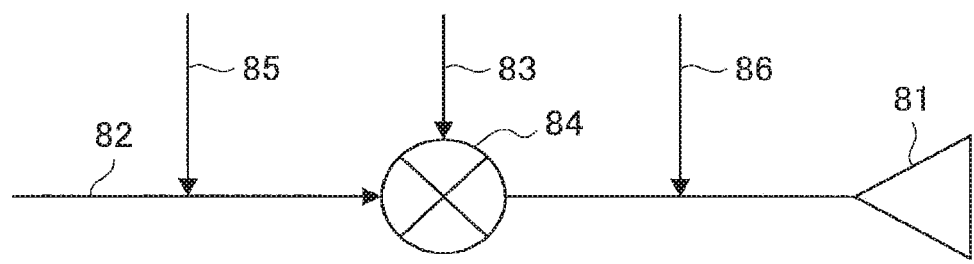
FIG. 3 is a diagram for describing a relationship between multiplication of weight coefficients and insertion of a reference signal.

FIG. 3 is a diagram for describing the relationship between multiplication of weight coefficients and insertion (or mapping) of a reference signal. Referring to FIG. 3, a transmission signal 82 corresponding to each antenna element 81 is complex-multiplied by a weight coefficient 83 by a multiplier 84. Thereafter, the transmission signal 82 complex-multiplied by the weight coefficient 83 is transmitted from the antenna element 81. Also, a DR-MS 85 is inserted before the multiplier 84, and is complex-multiplied by the weight coefficient 83 by the multiplier 84. Thereafter, the DR-MS 85 complex-multiplied by the weight coefficient 83 is transmitted from the antenna element 81. Meanwhile, a CRS 86 (and a CSI-RS) is inserted after the multiplier 84. Thereafter, the CRS 86 (and the CSI-RS) is transmitted from the antenna element 81 without being multiplied by the weight coefficient 83.

Since a CSI-RS is transmitted without beamforming as described above, a pure channel (or a channel response H) which is not affected by beamforming is estimated when measurement of the CSI-RS is performed. This channel H is used and a rank indicator (RI), a precoding matrix indicator (PMI) and a channel quality indicator (CQI) are fed back. Note that only a CQI is fed back depending on a transmission mode. Also, an amount of interference may be fed back.

(b) CSI-RS

Since a CSI-RS is transmitted without beamforming before release 12 as described above, the pure channel H which is not affected by beamforming is estimated when measurement of the CSI-RS is performed. Accordingly, the CSI-RS has been operated like a CRS.

A CRS is used for cell selection, synchronization and the like and thus a CRS transmission frequency is higher than a CSI-RS transmission frequency. That is, a CSI-RS period is longer than a CRS period.

There may be a first approach for transmitting a CSI-RS without beamforming and a second approach for transmitting a CSI-RS with beamforming (i.e., transmitting a CSI-RS over a directional beam) in a large-scale MIMO environment. It can be said that the first approach is a conventional approach and the second approach is a new approach. A relationship between multiplication by a weight coefficient and insertion of a reference signal in the new approach (second approach) will be described below with reference to FIG. 4.

Figure 4:
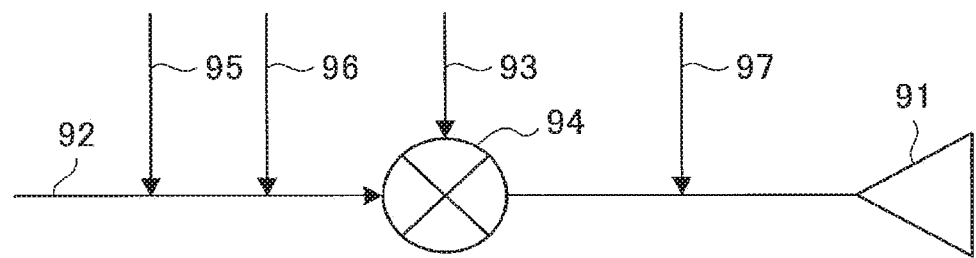
FIG. 4 is a diagram for describing a relationship between multiplication by a weight coefficient and insertion of a reference signal in a new approach.

FIG. 4 is a diagram for describing relationship between multiplication by a weight coefficient and insertion (or mapping) of a reference signal in the new approach. Referring to FIG. 4, a transmission signal 92 corresponding to each antenna element 91 is complex-multiplied by a weight coefficient 93 by a multiplier 94. Thereafter, the transmission signal 92 complex-multiplied by the weight coefficient 93 is transmitted from the antenna element 91. Also, a DR-MS 95 is inserted before the multiplier 94, and is complex-multiplied by the weight coefficient 93 by the multiplier 94. Thereafter, the DR-MS 95 complex-multiplied by the weight coefficient 93 is transmitted from the antenna element 91. Further, a CSI-RS 96 is inserted in front of the multiplier 94, and is complex-multiplied by the weight coefficient 93 in the multiplier 94. Then, the CSI-RS 96 complex-multiplied by the weight coefficient 93 is transmitted from the antenna element 91. Meanwhile, a CRS 97 (and a normal CSI-RS) is inserted after the multiplier 94. Thereafter, the CRS 97 (and the normal CSI-RS) is transmitted from the antenna element 91 without being multiplied by the weight coefficient 93.

1.2. Consideration Related to Embodiment of Present Disclosure

Consideration related to an embodiment of the present disclosure will be described with reference to FIGS. 5 to 7.

(1) Interference Between Directional Beams (a) Intra-Cell Interference

In an environment in which directional beams formed by an eNB are not reflected, interference is not generated between directional beams formed by the eNB. On the other hand, in an environment in which directional beams formed by an eNB are reflected, interference may be generated between directional beams formed by the eNB. A specific example of this will be described below with reference to FIGS. 5 and 6.

Figure 5:
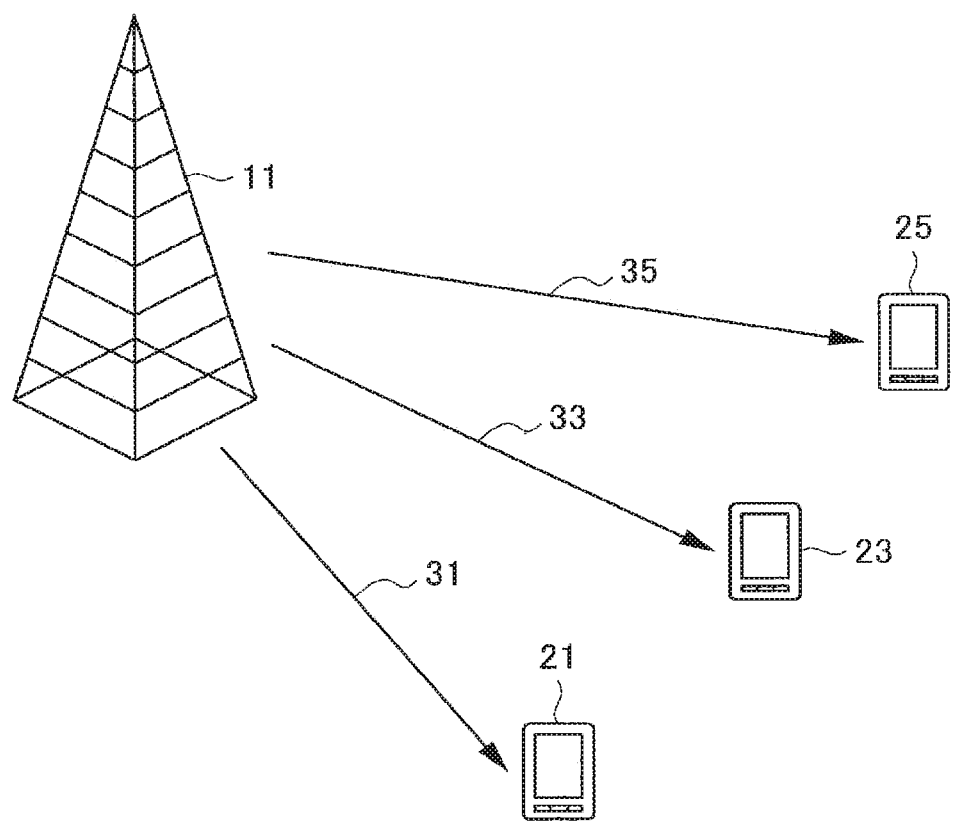
FIG. 5 is a diagram for describing an example of an environment in which directional beams are not reflected.

FIG. 5 is a diagram for describing an example of an environment in which directional beams are not reflected. Referring to FIG. 5, an eNB 11 and UEs 21, 23 and 25 are illustrated. For example, the eNB 11 forms a directional beam 31 directed toward the UE 21, a directional beam 33 directed toward the UE 23 and a directional beam 35 directed toward the UE 25. In this example, the directional beams 31, 33 and 35 are not reflected and interference is not generated among the directional beams 31, 33 and 35.

Figure 6:
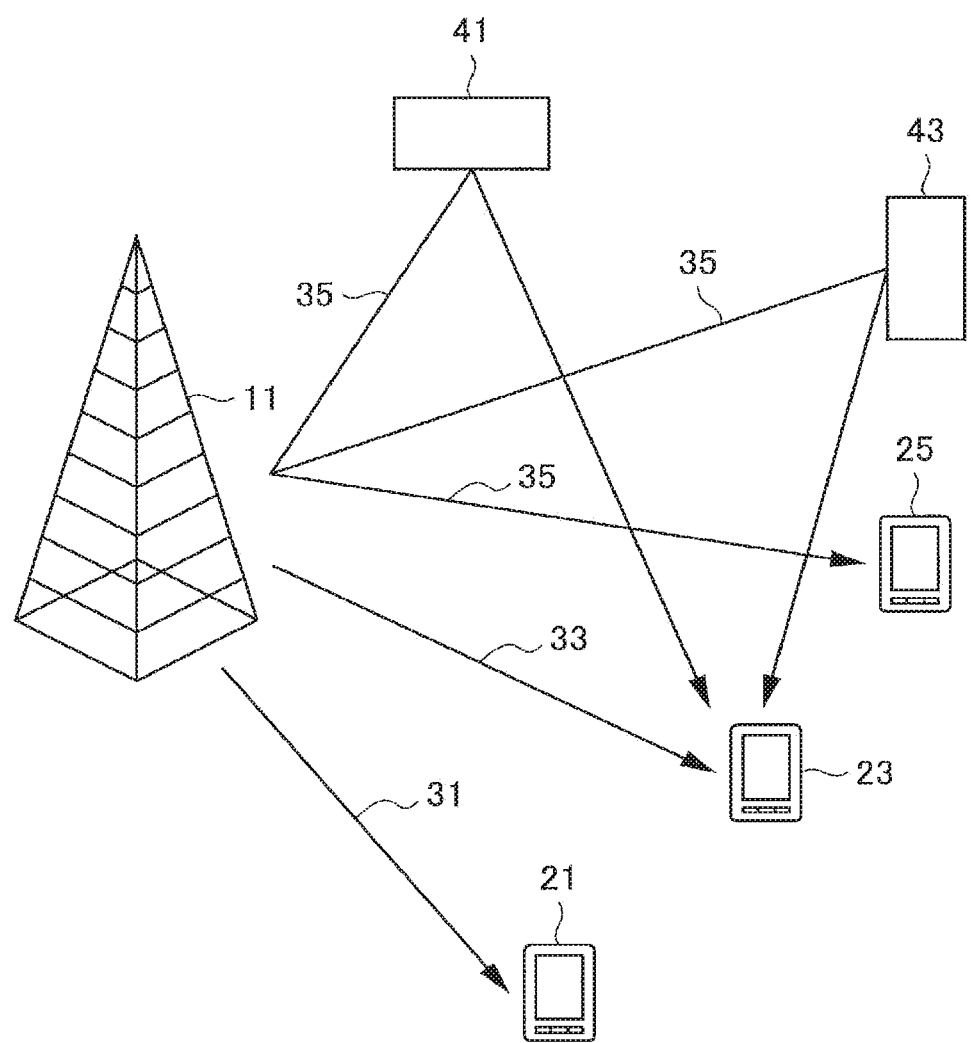
FIG. 6 is a diagram for describing an example of an environment in which directional beams are reflected.

FIG. 6 is a diagram for describing an example of an environment in which directional beams are reflected. Referring to FIG. 6, an eNB 11 and UEs 21, 23 and 25 are shown. Further, obstacles 41 and 43 are shown. For example, the obstacles 41 and 43 are buildings. For example, the eNB 11 forms a directional beam 31 directed toward the UE 21, a directional beam 33 directed toward the UE 23 and directional beams 35 directed toward the UE 25. In this example, the directional beams 35 are reflected by the obstacles 41 and 43 and arrive at the UE 23. Accordingly, interference is generated between the directional beam 33 and the directional beams 35.

(b) Inter-Cell Interference

Not only interference between directional beams in a cell but also interference between directional beams of different cells may be generated. A specific example of this will be described below with reference to FIG. 7.

Figure 7:
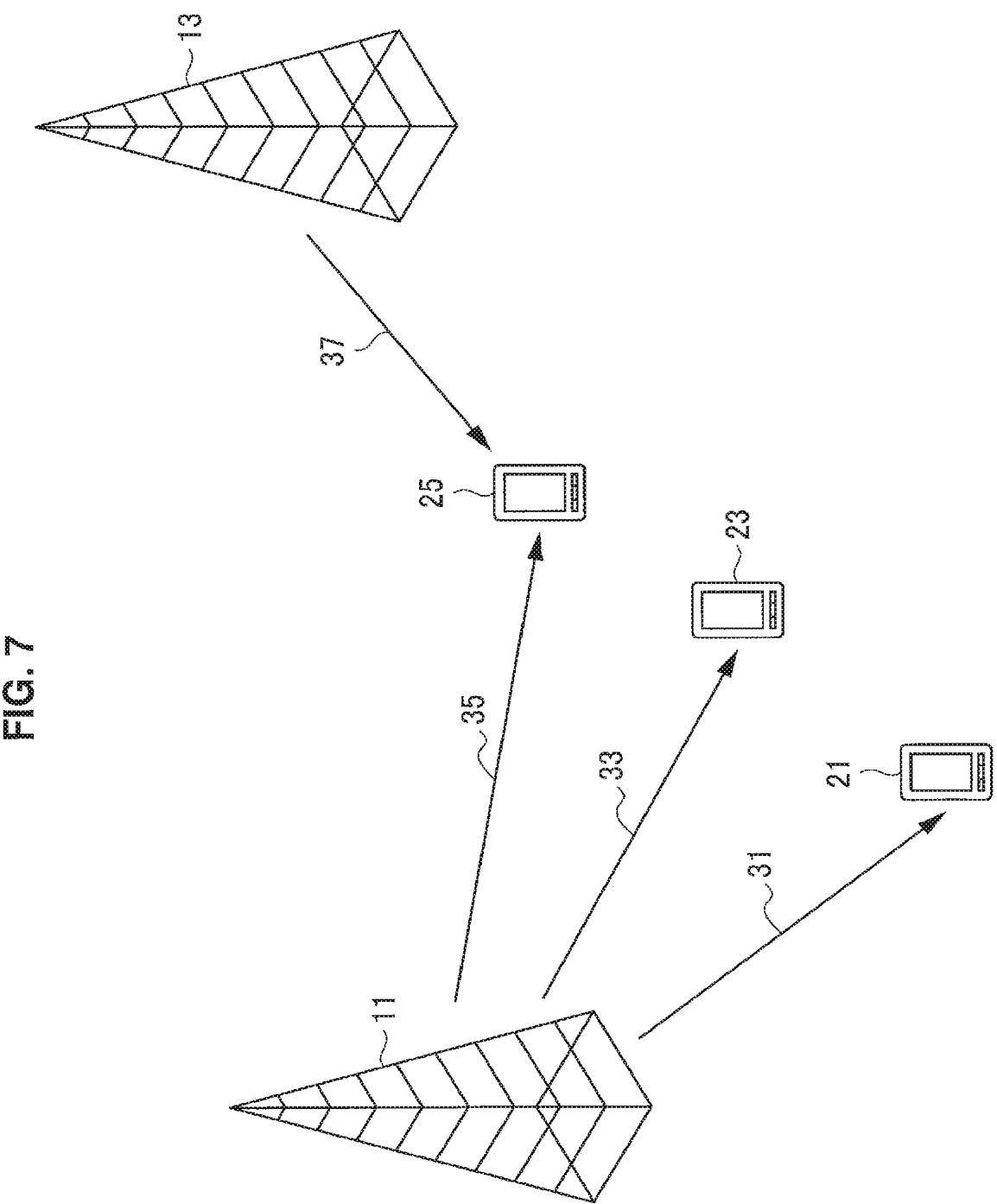
FIG. 7 is a diagram for describing an example of interference between directional beams of different cells.

FIG. 7 is a diagram for describing an example of interference between directional beams of different cells. Referring to FIG. 7, eNBs 11 and 13 and UEs 21, 23 and 25 are shown. For example, the eNB 11 forms a directional beam 31 toward the UE 21, a directional beam 33 toward the UE 23 and a directional beam 35 toward the UE 25. In addition, the eNB 13 forms a directional beam 37 which arrives at the UE 25. Accordingly, interference is generated between the directional beam 35 formed by the eNB 11 and the directional beam 37 formed by the eNB 13.

(c) Deterioration of Received Quality

As described above, when interference of a directional beam in a cell and/or interference of a directional beam between cells are generated, received quality of a UE deteriorates, and thus system throughput may decrease.

Interference may be generated between two directional beams or interference may be generated among three or more directional beams. How many directional beams generate interference varies according to UEs. Referring to FIG. 6, for example, interference is not generated in the UEs 21 and 25, whereas interference is generated among three directional beams in the UE 23. That is, an interference situation varies depending on place.

It can be said that a single operating band includes a high frequency band (component carriers) and a low frequency band (component carriers) but interference situations in the frequency bands are nearly the same.

(2) Required Countermeasures

When only a desired directional beam arrives at a UE, the UE can obtain high received quality. On the other hand, when not only a desired directional beam but also other directional beams arrive at a UE, received quality of the UE may deteriorate.

In order to suppress such interference, first of all, it is important for an eNB to ascertain a situation of interference of a directional beam. A UE reporting a situation of interference of a directional beam to the eNB is considered because the eNB cannot be aware of the situation of such interference of the directional beam. For example, calculating an amount of interference of a directional beam other than a desired directional beam from a CSI-RS is considered. Also, use of a CSI feedback procedure is considered.

In general, there are two types of channel quality measurement. One type is radio resource management (RRM) measurement such as measurement of reference signal received power (RSRP) and reference signal received quality (RSRQ) and the other is measurement for deciding an RI, a CQI, a PMI and the like included in CSI. The former is mainly performed for cell selection by both a UE in an RRC idle mode and a UE in an RRC connected mode. On the other hand, the latter is performed to recognize an interference situation by a UE in an RRC connected mode.

(3) CSI-RS

A CSI-RS is defined in release 10. A normal CSI-RS is also referred to as a non-zero-power CSI-RS. The purpose of the CSI-RS is to acquire a pure channel and thus the CSI-RS is transmitted without beamforming.

Also, a zero-power CSI-RS is defined. The zero-power CSI-RS is defined in order to enable easy observation of relatively weak signals from other eNBs. Since an eNB does not transmit a signal in radio resources (resource elements) for the zero-power CSI-RS, a UE can receive signals from other eNBs in the radio resources.

A CSI-RS period is variable between 5 ms and 80 ms. In addition, 400 radio resources are prepared in one subframe as candidates for radio resources in which the CSI-RS is transmitted.

Conventionally, only one CSI-RS is configured for one cell. On the other hand, a plurality of zero-power CSI-RSs can be configured for one cell. Accordingly, when a serving eNB of a UE configures a zero-power CSI-RS in accordance with a configuration of a CSI-RS of a neighbor eNB, the UE can perform measurement of the CSI-RS of the neighbor eNB without being affected by a signal from the serving eNB.

Note that a CSI-RS configuration is cell-specific. A UE may be notified of the configuration through signaling of a higher layer.

2. Schematic Configuration of System

Figure 8:
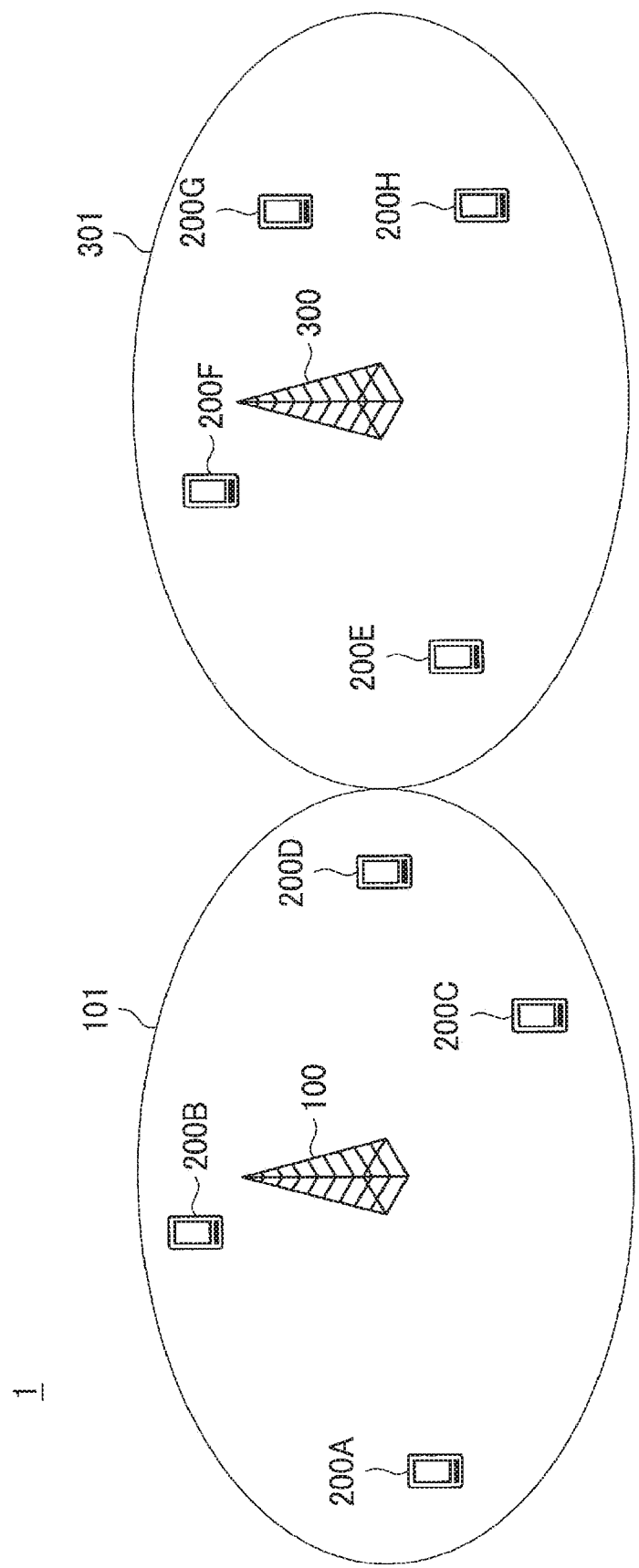
FIG. 8 is a diagram for describing an example of a schematic configuration of a system according to an embodiment of the present disclosure.

Next, a schematic configuration of a communication system 1 according to an embodiment of the present disclosure will be described with reference to FIG. 8. FIG. 8 is a diagram for describing an example of the schematic configuration of the communication system 1 according to an embodiment of the present disclosure. Referring to FIG. 8, the system 1 includes a base station 100, a terminal apparatus 200, and a base station 300. The system 1 is a system which complies with, for example, LTE, LTE-Advanced, or similar communication standards.
(Base Station 100)

The base station 100 performs wireless communication with the terminal apparatuses 200. For example, the base station 100 performs wireless communication with the terminal apparatuses 200 located in a cell 101 of the base station 100.

Particularly, in an embodiment of the present disclosure, the base station 100 performs beamforming. For example, the beamforming is beamforming of large-scale MIMO. The beamforming may also be referred to as beamforming of massive MIMO, beamforming of free dimension MIMO or three-dimensional beamforming. Specifically, for example, the base station 100 includes a directional antenna usable for large-scale MIMO and performs beamforming of large-scale MIMO by multiplying a transmission signal by a weight set for the directional antenna.

For example, the base station 100 transmits a reference signal for channel quality measurement over a directional beam. For example, the reference signal is a CSI-RS. Note that the embodiment of the present disclosure is not limited to such an example and the base station 100 may transmit the reference signal without beamforming.
(Terminal Apparatus 200)

The terminal apparatus 200 performs wireless communication with a base station. For example, the terminal apparatus 200 performs wireless communication with the base station 100 when located within a cell 101 of the base station 100. For example, the base station 200 performs wireless communication with a base station 300 when located within a cell 301 of the base station 300.

For example, terminal apparatuses 200A, 200B, 200C and 200D are connected to the base station 100. That is, the base station 100 is a serving base station of the terminal apparatuses 200A, 200B, 200C and 200D and the cell 101 is a serving cell of the terminal apparatuses 200A, 200B, 200C and 200D.

For example, terminal apparatuses 200E, 200F, 200G and 200H are connected to the base station 300. That is, the base station 300 is a serving base station of the terminal apparatuses 200E, 200F, 200G and 200H and the cell 301 is a serving cell of the terminal apparatuses 200E, 200F, 200G and 200H.
(Base Station 300)

The base station 300 is a neighbor base station of the base station 100. It may also be said that the base station 100 is a neighbor base station of the base station 300.

For example, the base station 300 has the same configuration as the base station 100 and performs the same operation as the base station 100. In other words, the base station 100 has the same configuration as the base station 300 and performs the same operation as the base station 300.

Although FIG. 8 illustrates only the base station 300 as a neighbor base station of the base station 100, of course, the system 1 may include a plurality of neighbor base stations of the base station 100.

Note that both the base station 100 and the base station 300 may be base stations of macro cells. Alternatively, both the base station 100 and the base station 300 may be base stations of small cells. Alternatively, one of the base station 100 and the base station 300 may be a base station of a macro cell and the other of the base station 10 and the base station 300 may be a base station of a small cell.

3. Configuration of Each Apparatus

Figure 9:
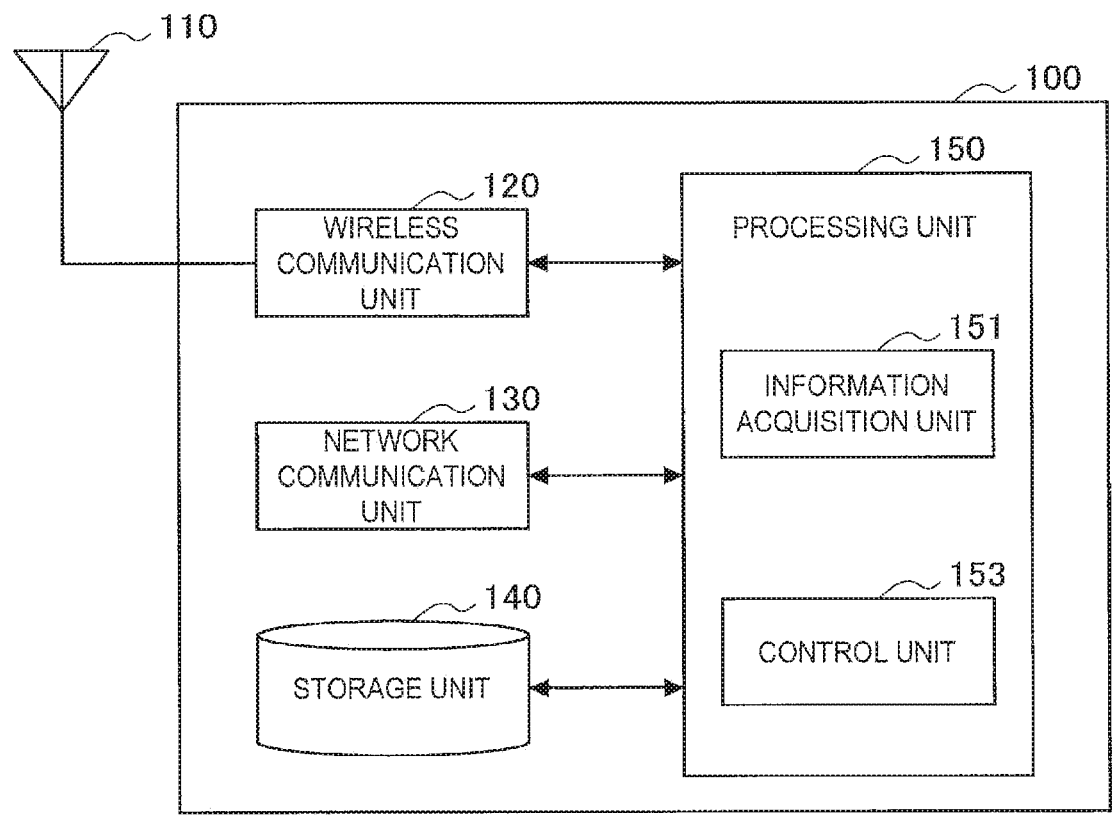
FIG. 9 describes an example of a configuration of a base station according to the present embodiment.
Figure 10:
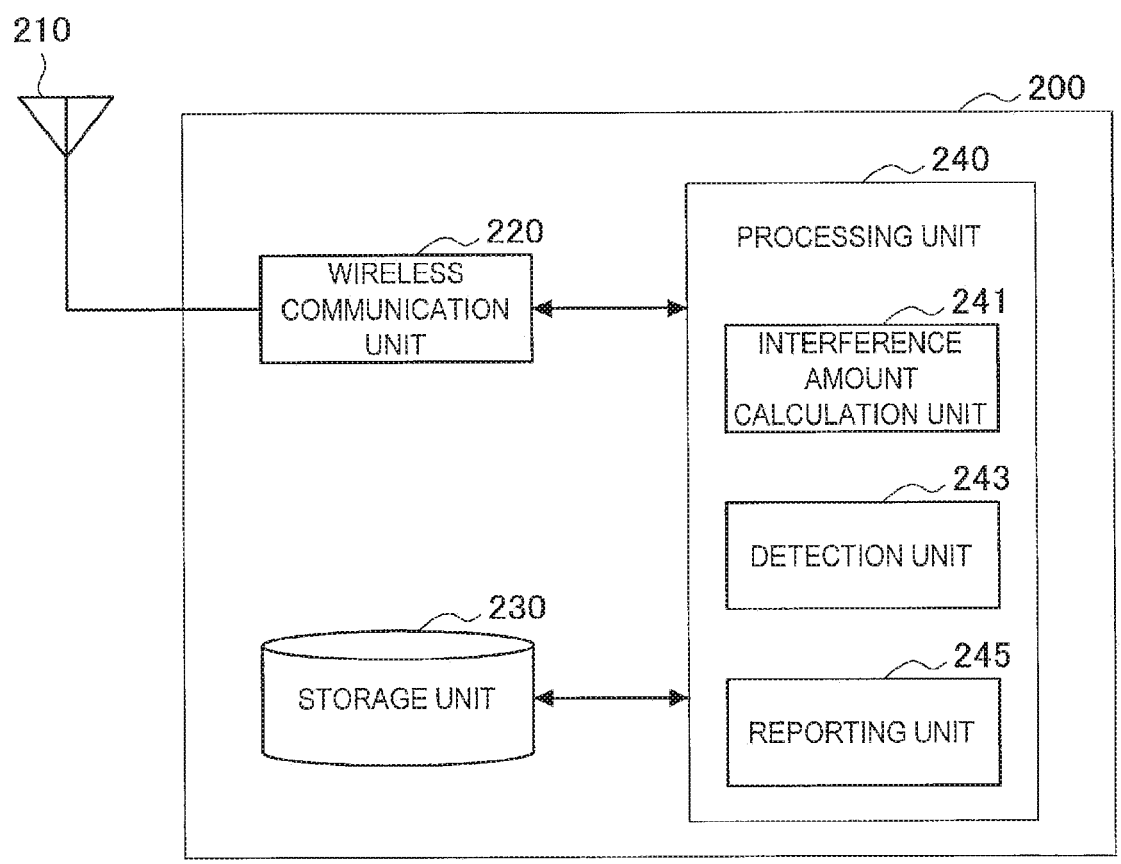
FIG. 10 is a block diagram illustrating an example of a configuration of a terminal apparatus according to the present embodiment.

Next, examples of configurations of the base station 100 and the terminal apparatus 200 will be described with reference to FIGS. 9 and 10.

3.1. Configuration of Base Station

First of all, an example of the configuration of the base station 100 according to an embodiment of the present disclosure will be described with reference to FIG. 9. FIG. 9 is a block diagram showing an example of the configuration of the base station 100 according to the embodiment of the present disclosure. Referring to FIG. 9, the base station 100 includes an antenna unit 110, a wireless communication unit 120, a network communication unit 130, a storage unit 140, and a processing unit 150.
(Antenna Unit 110)

The antenna unit 110 radiates a signal output by the wireless communication unit 120, in the form of radio waves, into space. The antenna unit 110 also converts radio waves in space into a signal, and outputs the signal to the wireless communication unit 120.

For example, the antenna unit 110 includes a directional antenna. For example, the directional antenna is a directional antenna which can be used in large-scale MIMO.
(Wireless Communication Unit 120)

The wireless communication unit 120 transmits and receives signals. For example, the wireless communication unit 120 transmits a downlink signal to the terminal apparatus 200 and receives an uplink signal from the terminal apparatus 200.
(Network Communication Unit 130)

The network communication unit 130 transmits and receives information. For example, the network communication unit 130 transmits information to other nodes and receives information from other nodes. For example, the other nodes include other base stations (for example, base station 300) and a core network node.

(Storage Unit 140)

The storage unit 140 stores programs and data for operation of the base station 100.

(Processing Unit 150)

The processing unit 150 provides various functions of the base station 100. The processing unit 150 includes an information acquisition unit 151 and a control unit 153. Note that the processing unit 150 may further include other components in addition to such components. That is, the processing unit 150 may perform operations other than operations of such components.

Specific operations of the information acquisition unit 151 and the control unit 153 will be described below in detail.

3.2. Configuration of Terminal Apparatus

Next, an example of the configuration of the terminal apparatus 200 according to an embodiment of the present disclosure will be described with reference to FIG. 10. FIG. 10 is a block diagram for showing an example of the configuration of the terminal apparatus 200 according to the embodiment of the present disclosure. Referring to FIG. 10, the terminal apparatus 200 includes an antenna unit 210, a wireless communication unit 220, a storage unit 230 and a processing unit 240.

(Antenna Unit 210)

The antenna unit 210 radiates a signal output by the wireless communication unit 220, in the form of radio waves, into space. The antenna unit 210 also converts radio waves in space into a signal, and outputs the signal to the wireless communication unit 220.

(Wireless Communication Unit 220)

The wireless communication unit 220 transmits and receives signals. For example, the wireless communication unit 220 receives a downlink signal from the base station and transmits an uplink signal to the base station.

(Storage Unit 230)

The storage unit 230 stores a program and data for operation of the terminal apparatus 200.

(Processing Unit 240)

The processing unit 240 provides various functions of the terminal apparatus 200. The processing unit 240 includes an interference amount calculation unit 241, a detection unit 243 and a reporting unit 245. Note that the processing unit 240 may further include components other than such components. That is, the processing unit 240 may also perform operations other than operations of such components.

Specific operations of the interference amount calculation unit 241, the detection unit 243 and the reporting unit 245 will be described below in detail.

4. Technical Features

Next, technical features according to the embodiment of the present disclosure will be described.

(1) Calculation of Amount of Interference of Directional Beam

For example, the terminal apparatus 200 (interference amount calculation unit 241) connected to the base station 300 calculates an amount of interference of a directional beam from a reference signal for channel quality measurement (e.g., a CSI-RS) transmitted by the base station 100.

As an example, the base station 100 transmits a reference signal for channel quality measurement over each of a plurality of directional beams which can be formed by the base station 100. In this case, the terminal apparatus 200 calculates an amount of interference of each of the plurality of directional beams from the reference signal for channel quality measurement transmitted over each of the plurality of directional beams. Note that, for example, a configuration (e.g., a radio resource used for transmission and/or a signal of) of a reference signal for channel quality measurement is different for each directional beam. Accordingly, it is possible to calculate an amount of interference of each directional beam.

As another example, the base station 100 may transmit a reference signal for channel quality measurement without beamforming. In this case, the terminal apparatus 200 may estimate a channel from the reference signal and virtually calculate an amount of interference of each of the plurality of directional beams on the basis of the channel and a plurality of precoding matrices corresponding to the plurality of directional beams. Specifically, the terminal apparatus 200 may calculate an amount of interference I(i) of a directional beam i=H*PM(i) on the basis of a channel H and a precoding matrix PM(i) of the directional beam i.

Note that, instead of the terminal apparatus 200, the base station 300 may virtually calculate an amount of interference of each of the plurality of directional beams on the basis of a channel reported by the terminal apparatus 200 (reporting unit 245) and the plurality of precoding matrices.

(2) Provision of Interference Beam Information

In the embodiment of the present disclosure, the base station 300 (i.e., a neighbor base station of the base station 100) provides, to the base station 100, information about a directional beam which is an interference source for the terminal apparatus 200 connected to the base station 300 (referred to as "interference beam information" hereinafter) from among a plurality of directional beams which can be formed by the base station 100.

(a) Directional Beam which is Interference Source (a-1) Directional Beam Having Large Amount of Interference For example, the directional beam which is an interference source for the terminal apparatus 200 is a directional beam having a large amount of interference (e.g., a directional beam having an amount of interference exceeding a threshold value) in the terminal apparatus 200. In this case, when there is a directional beam having a large amount of interference (e.g., a directional beam having an amount of interference exceeding a threshold value) in the terminal apparatus 200 connected to the base station 300, the base station 300 provides information about the directional beam (i.e., interference beam information) to the base station 100.

More specifically, on the basis of an amount of interference of a directional beam reported by the terminal apparatus 200 (reporting unit 245), for example, the base station 300 determines whether the amount of interference of the directional beam is large (e.g., whether the amount of interference exceeds a threshold value). Thereafter, the base station 300 provides information about the directional beam (i.e., interference beam information) to the base station 100 when it is determined that the amount of interference of the directional beam is large (e.g., the amount of interference exceeds the threshold value).

Alternatively, the terminal apparatus 200 may determine whether the amount of interference of the directional beam is large (e.g., whether the amount of interference exceeds the threshold value). Thereafter, the terminal apparatus 200 (reporting unit 245) may report the directional beam to the base station 300 when it is determined that the amount of interference of the directional beam is large (e.g., the amount of interference exceeds the threshold value). Then, the base station 300 may provide the information about the directional beam (i.e., interference beam information) to the base station 100.

(a-2) Directional Beam from which Amount of Interference is Calculated

The directional beam which is an interference source for the terminal apparatus 200 may be a directional beam from which an amount of interference in the terminal apparatus 200 is calculated. In this case, the base station 300 may provide information about the directional beam from which the amount of interference in the terminal apparatus 200 is calculated (i.e., interference beam information) to the base station 100 irrespective of whether the amount of interference is large or small. In this case, the base station 100 may determine whether the amount of interference of the directional beam is large (e.g., whether the amount of interference exceeds the threshold value).

(a-3) Others

The directional beam which is an interference source for the terminal apparatus 200 may be a directional beam which obstructs detection of another reference signal for channel quality measurement in the terminal apparatus 200. The other reference signal may be a reference signal transmitted by another base station in the same radio resource as that for the reference signal transmitted by the base station 100. In this case, when there is a directional beam which obstructs the other reference signal for channel quality measurement, the base station 300 may provide information about the directional beam (i.e., interference beam information) to the base station 100.

(b) Interference Beam Information (b-1) Specification Information

For example, the interference beam information includes information for specifying the directional beam (referred to as "specification information" hereinafter).

As an example, the specification information is information which indicates a precoding matrix (e.g., a PMI) used to form the directional beam.

As another example, a reference signal for channel quality measurement (e.g., a CSI-RS) may be transmitted over a directional beam and a configuration of a reference signal for channel quality measurement may be provided to each directional beam. That is, a directional beam and a configuration may be correlated. In this case, the specification information may be information indicating a configuration of a reference signal for channel quality measurement.

Accordingly, the base station 300 may recognize a directional beam to handle, for example.

(b-2) Interference Amount Information

The interference beam information may include information indicating the amount of interference of the directional beam. The amount of interference may be the amount of interference of the directional beam in the terminal apparatus 200 connected to the base station 300. Accordingly, the base station 300 may execute an operation depending on the amount of interference, for example.

(c) Provision Technique

For example, the base station 300 generates a message (a message for the base station 100) including the interference beam information. Thereafter, the base station 300 transmits the message to the base station 100.

(3) Decision of Operation Related to Transmission Over Directional Beam

In the embodiment of the present disclosure, the base station 100 (information acquisition unit 151) acquires the interference beam information (i.e., information about a directional beam which is an interference source for the terminal apparatus 200 connected to the base station 300 from among a plurality of directional beams which can be formed by the base station 100) provided by the base station 300. Thereafter, the base station 100 (control unit 153) decides an operation of the base station 100 regarding transmission of a signal over the directional beam on the basis of the interference beam information.

(a) Signal

For example, the signal includes a data signal.

For example, the signal includes a reference signal for channel quality measurement. More specifically, the reference signal is a channel state information reference signal (CSI-RS), for example.

(b) Operation (b-1) First Example (Suspension)

As a first example, the base station 100 (control unit 153) decides suspension of transmission of the signal over the directional beam as the operation. Thereafter, the base station 100 suspends transmission of the signal over the directional beam.

For example, the base station 100 (control unit 153) decides and executes suspension of transmission of a data signal and/or the reference signal over the directional beam.

Accordingly, it is possible to cancel interference of the directional beam in the terminal apparatus 200 connected to the base station 300, for example.

(b-2) Second Example (Restriction)

As a second example, the base station 100 (control unit 153) decides restriction on transmission of the signal over the directional beam as the operation. Thereafter, the base station 100 restricts transmission of the signal over the directional beam.

Data Signal

For example, the restriction includes restricting radio resources in which a data signal is transmitted over the directional beam. That is, the base station 100 (control unit 153) decides restriction on radio resources in which a data signal is transmitted over the directional beam and restricts the radio resources. Consequently, the base station 100 transmits the data signal in the restricted radio resources over the directional beam.

More specifically, the restriction includes restricting, for example, time resources in which a data signal is transmitted over the directional beam. For example, the time resources are subframes. In this case, the base station 100 transmits the data signal in the restricted subframes over the directional beam.

Note that the restriction may include restricting frequency resources in which a data signal is transmitted over the directional beam. Also, the restriction may include restricting time and frequency resources in which a data signal is transmitted over the directional beam.

Reference Signal

For example, the restriction includes lengthening a period of transmission of a reference signal for channel quality measurement. That is, the base station 100 (control unit 153) decides lengthening of a period of transmission of a reference signal for channel quality measurement over the directional beam and lengthens the period. That is, the base station 100 (control unit 153) changes the period in the configuration of the reference signal for channel quality measurement transmitted over the direction beam to a long period.

Accordingly, it is possible to suppress interference of the directional beam in the terminal apparatus 200 connected to the base station 300, for example.

(b-3) Third Example (Continuation)

For example, the base station 100 (control unit 153) decides continuation of transmission of the signal over the directional beam as the operation. Thereafter, the base station 100 continuously transmits the signal over the directional beam.

Accordingly, it is possible to continue transmission of the signal over the directional beam when it is difficult to suspend and restrict transmission of the signal over the directional beam, for example.

(b-4) Others

The restriction may include changing the configuration (e.g., radio resources used to transmit a signal (including a period) and/or a sequence of the signal) of a reference signal for channel quality measurement through the directional beam. That is, the base station 100 (control unit 153) may decide changing of the configuration and change the configuration.

As described above, the directional beam may be a directional beam which obstructs detection of another reference signal for channel quality measurement (e.g., another CSI-RS) in the terminal apparatus 200. The base station 100 (control unit 153) may decide changing of the configuration and change the configuration.

Accordingly, the terminal apparatus 200 connected to the base station 300 can detect another reference signal for channel quality measurement, for example.

(c) Operation Decision Technique

For example, the base station 100 (control unit 153) decides an operation of the base station 100 from among the aforementioned various operations. Hereinafter, examples of a technique for deciding the operation will be described. Note that decision of the operation according to the present embodiment is not limited to such examples.

Decision Based on Situation of Transmission of Data Signal

For example, the base station 100 may transmit a data signal to neither of terminal apparatuses 200 over the directional beam. In this case, the base station 100 (control unit 153) decides and executes suspension of transmission of the data signal over the directional beam, for example.

For example, the base station 100 transmits a data signal to a small number of terminal apparatuses 200 (e.g., a number of terminal apparatuses 200 equal to or less than a predetermined number) over the directional beam. In this case, for example, the base station 100 (control unit 153) decides and executes restriction on transmission of the data signal over the directional beam (e.g., restriction on radio resources in which the data signal is transmitted over the directional beam).

For example, the base station 100 transmits a data signal to a large number of terminal apparatuses 200 (e.g., a number of terminal apparatuses 200 exceeding a predetermined number) over the directional beam. In this case, for example, the base station 100 (control unit 153) decides and executes continuation of transmission of the data signal over the directional beam.

Decision Based on Situation of Disposition of Terminal Apparatus 200

For example, the number of terminal apparatuses 200 connected to the base station 100 and located in a radiation direction of the directional beam is small. More specifically, the number of terminal apparatuses 200 located in the radiation direction of the directional beam is equal to or less than a predetermined number, for example. In this case, the base station 100 (control unit 153) decides and executes suspension of or restriction on transmission of a data signal and/or a reference signal for channel quality measurement over the directional beam.

For example, the number of terminal apparatuses 200 connected to the base station 100 and located in the radiation direction of the directional beam is large. More specifically, the number of terminal apparatuses 200 located in the radiation direction of the directional beam exceeds the predetermined number, for example. In this case, the base station 100 (control unit 153) decides and executes continuation of transmission of a data signal and/or a reference signal for channel quality measurement over the directional beam.

Note that the predetermined number may be equal to or larger than 1 or may be 0.

As described above, the base station 100 (control unit 153) decides an operation of the base station 100 regarding transmission of the signal over the directional beam on the basis of the interference beam information. Accordingly, it is possible to further decrease interference of a directional beam between cells (i.e., between the cell 101 and the cell 301), for example.

(4) Notification (a) Notification to Neighbor Base Station

For example, the base station 100 (control unit 153) notifies the base station 300 of the operation of the base station 100 regarding transmission of the signal over the directional beam.

More specifically, for example, the base station 100 (control unit 153) generates a message (a message for the base station 300) including operation information indicating the operation (e.g., suspension, restriction or continuation) of the base station 100 regarding transmission of the signal over the directional beam. Thereafter, the base station 100 transmits the message to the base station 300 through an interface (e.g., an X2 interface) between the base station 100 and the base station 300.

Accordingly, the base station 300 can recognize how interference of a directional beam in the terminal apparatus 200 connected to the base station 300 changes, for example.

(b) Notification to Terminal Apparatus

The base station 100 (control unit 153) may notify the base station 300 of the operation of the base station 100 regarding transmission of the signal over the directional beam.

The base station 100 (control unit 153) may decide and execute, as the operation, change of a configuration of a reference signal for channel quality measurement transmitted over the directional beam (including lengthening the period). In this case, the base station 100 may notify the terminal apparatus 200 of the change of the configuration.

(5) Cancellation of Operation

For example, the base station 100 (control unit 153) cancels the operation of the base station 100 regarding transmission of the signal over the directional beam when a cancellation condition is satisfied. For example, the operation is suspension, restriction, or the like of transmission of the signal over the directional beam. Accordingly, it is possible to set suspension of or restriction on transmission of the signal over the directional beam within a limited range, for example.

(a) Elapsed Time

For example, the cancellation condition includes a condition that an elapsed time from initiation of the operation exceed a predetermined time. That is, the base station 100 (control unit 153) cancels the operation when the elapsed time from initiation of the operation exceeds the predetermined time.

More specifically, the base station 100 (control unit 153) starts a timer when the operation of the base station 100 regarding transmission of the signal over the directional beam is initiated, for example. Thereafter, the base station 100 (control unit 153) cancels the operation when the timer expires.

Accordingly, it is possible to set suspension of or restriction on transmission of the signal over the directional beam within a limited time, for example.

(b) Reception of Cancellation Information

For example, the cancellation condition includes reception, by the base station 100, of cancellation information about cancellation of the operation from the base station 300. That is, the base station 100 (control unit 153) cancels the operation upon receiving the cancellation information from the base station 300.

For example, the base station 300 generates a cancellation message including the cancellation information and transmits the cancellation message to the base station 100.

(b-1) Cancellation Information

Beam Information

For example, the cancellation information includes information for specifying the directional beam (i.e., specification information).

Restriction Information

The cancellation information may include restriction information indicating restriction on transmission of the signal over the directional beam after cancellation.

Specifically, the restriction information may indicate, as the restriction, radio resources or a period in which the signal is transmitted over the directional beam. Also, the restriction information may indicate a configuration of a reference signal for channel quality measurement transmitted over the directional beam as the restriction.

In such a case, the base station 100 may transmit the signal over the directional beam in accordance with the restriction indicated by the restriction information after cancellation of the operation.

According to such restriction information, it is possible to adjust a balance between transmission of a directional beam and avoidance or suppression of interference more flexibly, for example.

(b-2) Trigger of Transmission of Cancellation Information

For example, the base station 300 transmits the cancellation information to the base station 100 when interference of the directional beam is assumed to be small.

First Example

As a first example, the base station 300 transmits the cancellation information to the base station 100 when the terminal apparatus 200 (terminal apparatus 200 connected to the base station 300) which receives interference of the directional beam finishes receiving a data signal.

Second Example

As a second example, the base station 300 transmits the cancellation information to the base station 100 when the terminal apparatus 200 (terminal apparatus 200 connected to the base station 300) which receives interference of the directional beam at a certain position moves from the certain position to a different position.

Third Example

As a third example, the terminal apparatus 200 connected to the base station 300 may detect a radio resource having a small amount of interference from among radio resources in which reference signals for channel quality measurement are transmitted. In this case, the base station 300 may transmit cancellation information related to suspension of or restriction on a reference signal for channel quality measurement to the base station 100. The cancellation information may include information indicating a configuration including the radio resource as restriction information indicating restriction on transmission of a reference signal for channel quality measurement over the directional beam after cancellation. Thereafter, the base station 100 may transmit a reference signal for channel quality measurement having the configuration over the directional beam.

Note that the terminal apparatus 200 (interference amount calculation unit 241) may calculate an amount of interference from a reference signal for channel quality measurement transmitted by a neighbor base station (including a neighbor base station other than the base station 100) of the base station 300 that is a serving base station. Thereafter, the terminal apparatus 200 (detection unit 243) may detect a radio resource having a small amount of interference (e.g., a radio resource having an amount of interference less than a threshold value) from among radio resources in which the reference signal is transmitted. Then, the terminal apparatus 200 (reporting unit 245) may report the radio resource having a small amount of interference to the base station 300. Thereafter, the base station 300 may transmit cancellation information to the base station 100, and the cancellation information may include information indicating a configuration including the radio resource as restriction information.

A trigger of transmission of the cancellation information to the base station 100 is not limited to the aforementioned first to third examples and may be a different one.

(c) Notification of Completion of Cancellation

For example, the base station 100 (control unit 153) notifies the base station of completion of cancellation of the operation. For example, the base station 100 (control unit 153) transmits a message including cancellation completion information indicating completion of cancellation of the operation to the base station 300.

Note that the base station 100 (control unit 153) may notify the terminal apparatus 200 of completion of cancellation of the operation.

5. Processing Flow

Next, an example of a process according to the embodiment of the present disclosure will be described with reference to FIGS. 11 to 13.

(1) First Example

Figure 11:
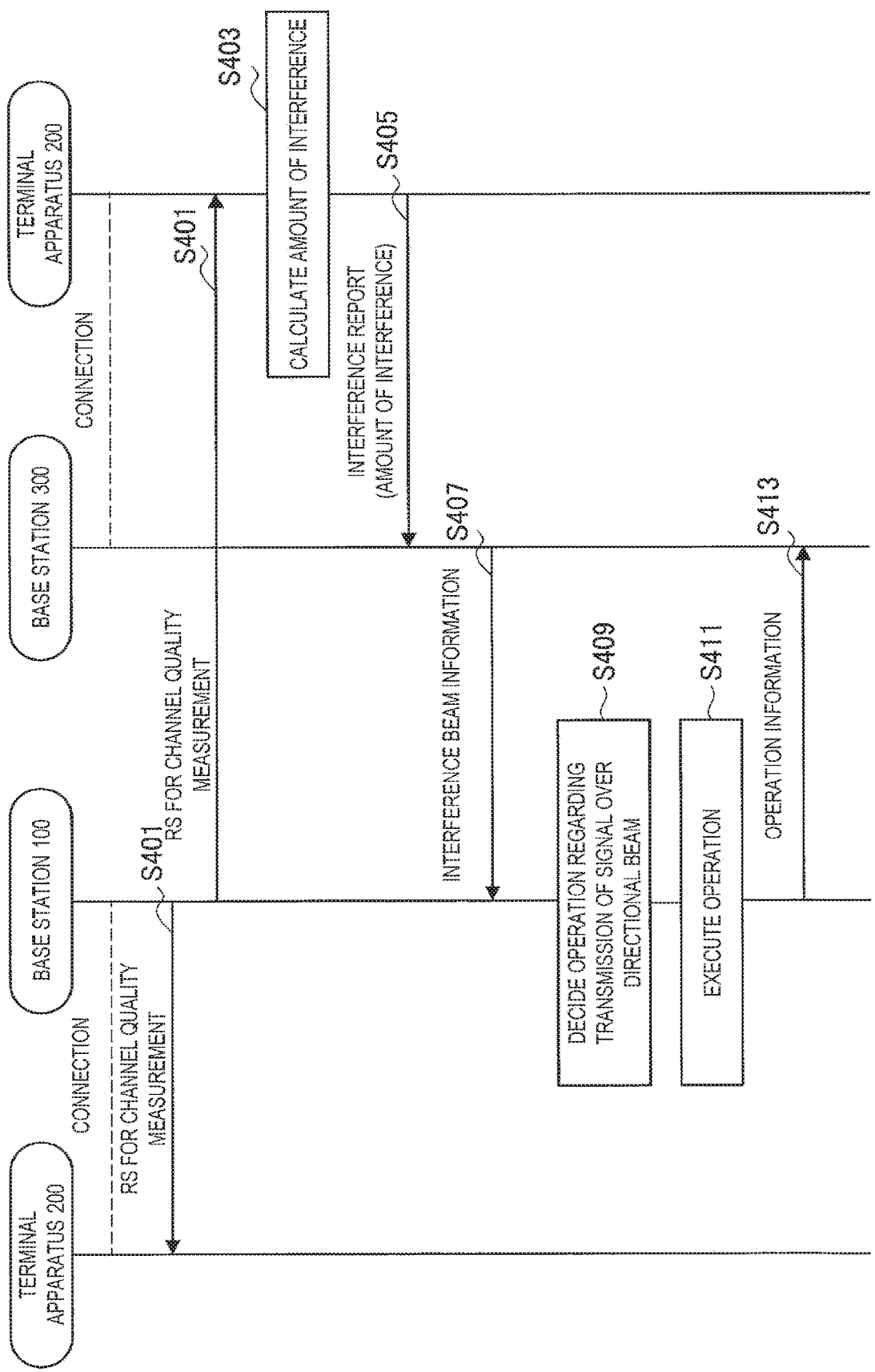
FIG. 11 is a sequence diagram illustrating a first example of a schematic flow of a process according to the present embodiment.

FIG. 11 is a sequence diagram illustrating a first example of a schematic flow of the process according to the embodiment of the present disclosure.

The base station 100 transmits a reference signal for channel quality measurement (e.g., a CSI-RS) (S401).

The terminal apparatus 200 connected to the base station 300 calculates an amount of interference from the reference signal (S403). For example, the terminal apparatus 200 calculates an amount of interference of each of a plurality of directional beams which can be formed by the base station 100.

Further, the terminal apparatus 200 reports the amount of interference to the base station 300 (S405). For example, the terminal apparatus 200 transmits an interference report indicating the amount of interference to the base station 300.

The base station 300 provides, to the base station 100, information (i.e., interference beam information) about a directional beam which is an interference source for the terminal apparatus 200 connected to the base station 300 (e.g., a directional beam having a large amount of interference in the terminal apparatus 200) from among the plurality of directional beams (S407). For example, the base station 300 transmits a message including the interference beam information to the base station 100.

The base station 100 acquires the interference beam information and decides an operation of the base station 100 regarding transmission of a signal over the directional beam on the basis of the interference beam information (S409). Then, the base station 100 executes the operation (S411). Also, the base station 100 notifies the base station 300 of the operation (S413). For example, the base station 100 transmits a message including operation information indicating the operation to the base station 300.

Note that the base station 100 may notify the terminal apparatus 200 connected to the base station 100 of the operation. Also, the base station 300 may notify the terminal apparatus 200 connected to the base station 300 of the operation.

(2) Second Example

Figure 12:
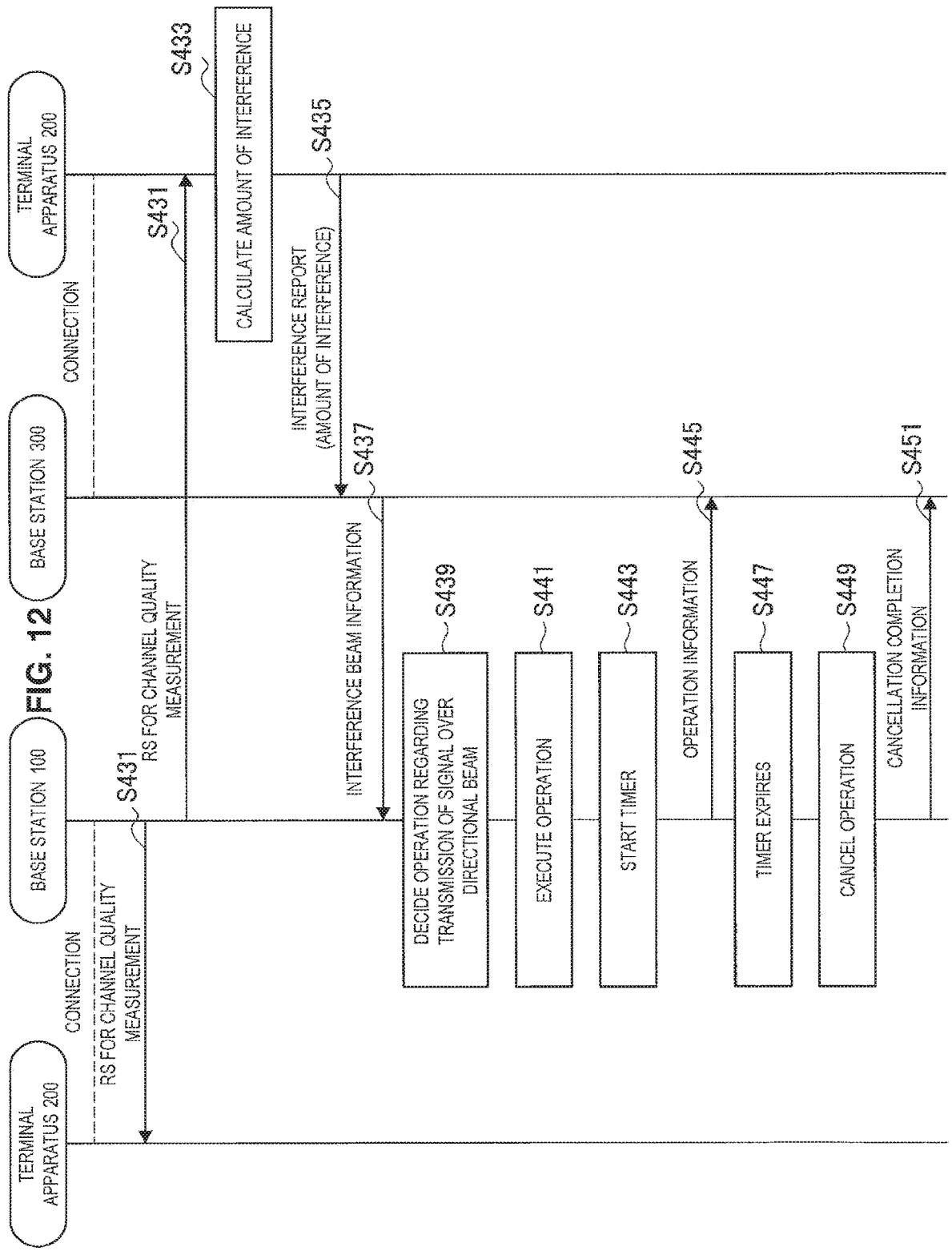
FIG. 12 is a sequence diagram illustrating a second example of a schematic flow of the process according to the present embodiment.

FIG. 12 is a sequence diagram illustrating a second example of a schematic flow of the process according to the embodiment of the present disclosure.

Here, description of steps S431 to S441 and S445 in the second example illustrated in FIG. 12 is the same as description of steps S401 to S413 in the first example illustrated in FIG. 11, and thus only steps S443 and S447 to S451 will be described.

The base station 100 starts a timer when an operation regarding transmission of a signal over a directional beam (i.e., the operation decided in step S431) is initiated (S443).

Thereafter, the base station 100 cancels the operation (S449) when the timer expires (S447). Then, the base station 100 notifies the base station 300 of completion of cancellation of the operation (S451). For example, the base station 100 transmits a message including cancellation completion information indicating completion of cancellation of the operation to the base station 300.

Note that the base station 100 may notify the terminal apparatus 200 connected to the base station 100 of completion of cancellation of the operation. Also, the base station 300 may notify the terminal apparatus 200 connected to the base station 300 of completion of cancellation of the operation.

(3) Third Example

Figure 13:
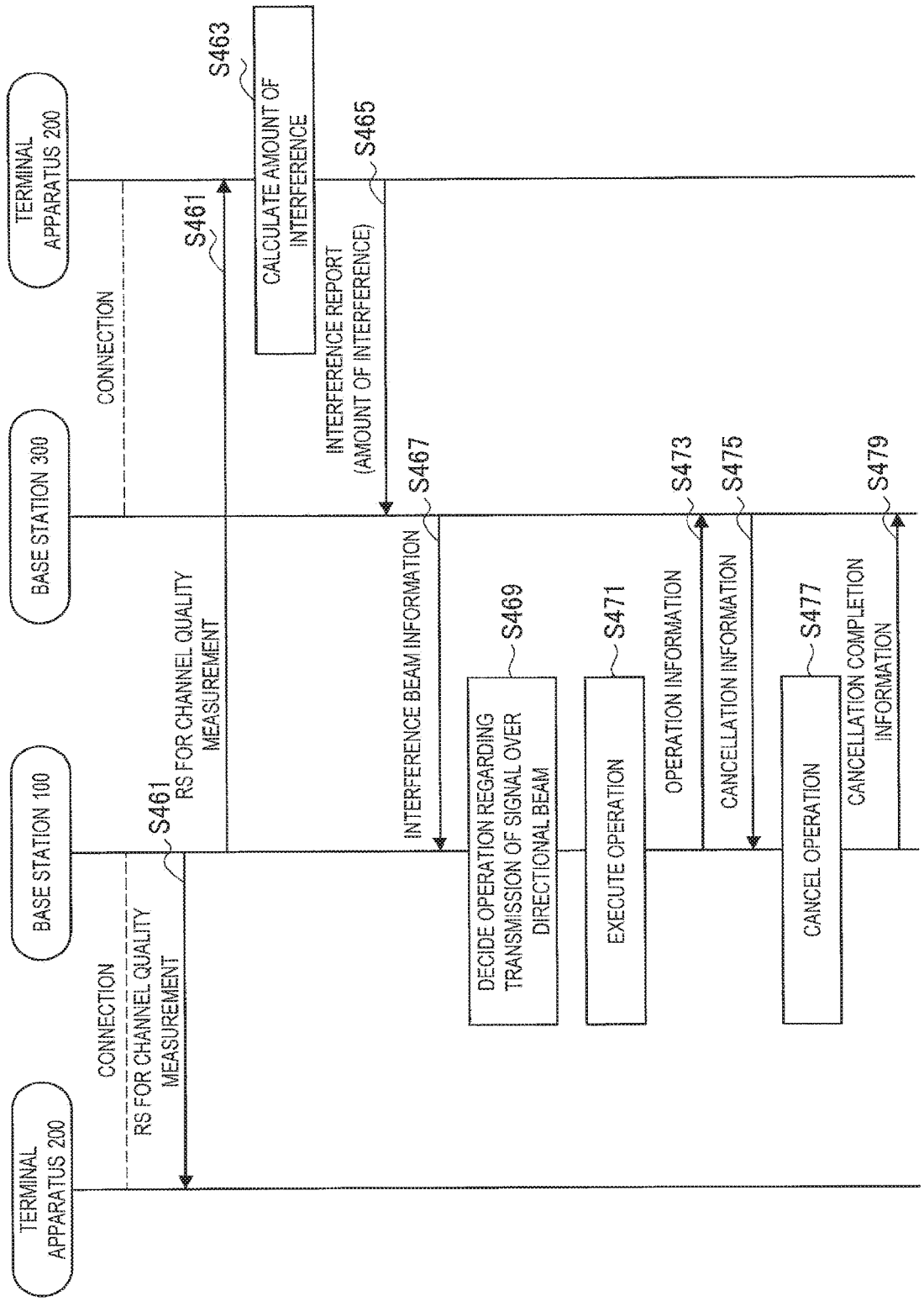
FIG. 13 is a sequence diagram illustrating a third example of a schematic flow of the process according to the present embodiment.

FIG. 13 is a sequence diagram illustrating a third example of a schematic flow of the process according to the embodiment of the present disclosure.

Here, description of steps S461 to S473 in the third example illustrated in FIG. 13 is the same as description of steps S401 to S413 in the first example illustrated in FIG. 11, and thus only steps S475 to S479 will be described.

The base station 300 transmits cancellation information about cancellation of an operation regarding transmission of a signal over a directional beam (i.e., the operation decided in step S469) to the base station 100 (S475). For example, the base station 300 transmits a message including the cancellation information to the base station 100.

The base station 100 cancels the operation in response to reception of the cancellation information (S477). Then, the base station 100 notifies the base station 300 of completion of cancellation of the operation (S479). For example, the base station 100 transmits a message including cancellation completion information indicating completion of cancellation of the operation to the base station 300.

Note that the base station 100 may notify the terminal apparatus 200 connected to the base station 100 of completion of cancellation of the operation. Also, the base station 300 may notify the terminal apparatus 200 connected to the base station 300 of completion of cancellation of the operation.

6. Application Examples

The technique according to the present disclosure is applicable to various products. The base station 100 may also be implemented, for example, as any type of evolved Node B (eNB) such as macro eNBs and small eNBs. Small eNBs may cover smaller cells than the macrocells of pico eNBs, micro eNBs, or home (femt) eNBs. Instead, the base station 100 may be implemented as another type of base station such as Nodes B or base transceiver stations (BTSs). The base station 100 may include the main apparatus (which is also referred to as base station apparatus) that controls wireless communication and one or more remote radio heads (RRHs) that are disposed at different locations from that of the main apparatus. Also, various types of terminals described below may function as the base station 100 by temporarily or semi-permanently executing the functionality of the base station. Furthermore, at least some of components of the base station 100 may be realized in a base station apparatus or a module for a base station apparatus.

Further, the terminal apparatus 200 may be implemented as a mobile terminal such as smartphones, tablet personal computers (PCs), notebook PCs, portable game terminals, portable/dongle mobile routers, and digital cameras, or an in-vehicle terminal such as car navigation apparatuses. The terminal apparatus 200 may be implemented as a machine type communication (MTC) for establishing a machine to machine communication (M2M). Furthermore, at least some of components of the terminal apparatus 200 may be implemented as a module (e.g. integrated circuit module constituted with a single die) that is mounted on these terminals.

6.1. Application Examples for Base Station

First Application Example

Figure 14:
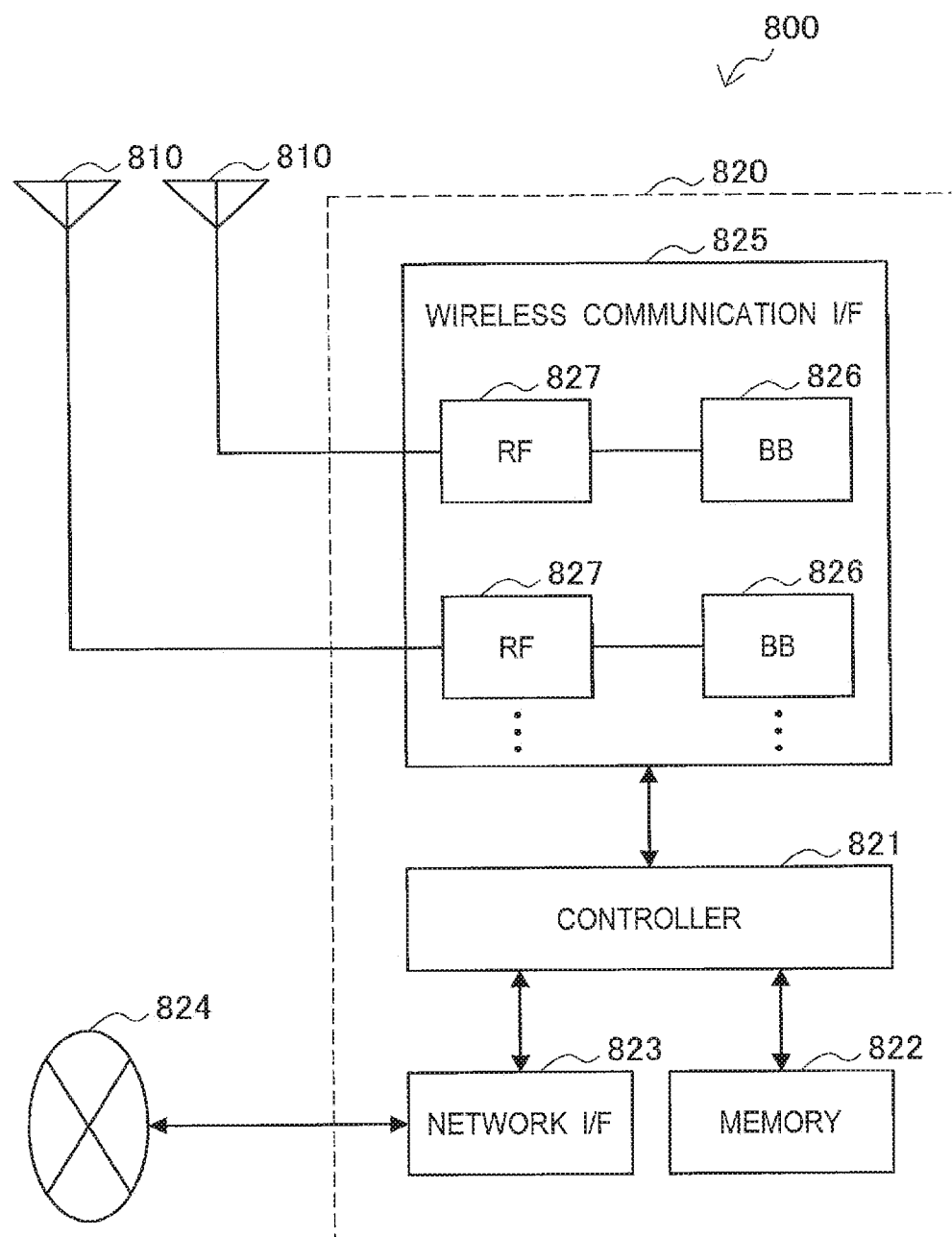
FIG. 14 is a block diagram illustrating a first example of a schematic configuration of an eNB.

FIG. 14 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. a plurality of antenna elements constituting a MIMO antenna) and is used for the base station apparatus 820 to transmit and receive a wireless signal. The eNB 800 may include the plurality of the antennas 810 as illustrated in FIG. 14, and the plurality of antennas 810 may, for example, correspond to a plurality of frequency bands used by the eNB 800. It should be noted that while FIG. 14 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, and scheduling. The control may be performed in cooperation with a surrounding eNB or a core network. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. The module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 14, and the plurality of BB processors 826 may, for example, correspond to a plurality of frequency bands used by the eNB 800. The wireless communication interface 825 may also include a plurality of the RF circuits 827, as illustrated in FIG. 14, and the plurality of RF circuits 827 may, for example, correspond to a plurality of antenna elements. FIG. 14 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 14, the information acquisition unit 151 and the control unit 153 described above with reference to FIG. 8 may be mounted in the wireless communication interface 825. Alternatively, at least some of the components may be mounted in the controller 821. As an example, the eNB 800 may be equipped with a module including some or all components of the wireless communication interface 825 (for example, the BB processor 826) and/or the controller 821, and the information acquisition unit 151 and the control unit 153 may be mounted in the module. In this case, the module may store a program causing the processor to function as the information acquisition unit 151 and the control unit 153 (that is, a program causing the processor to perform the operation of the information acquisition unit 151 and the control unit 153) and execute the program. As another example, the program causing the processor to function as the information acquisition unit 151 and the control unit 153 may be installed in the eNB 800, and the wireless communication interface 825 (for example, the BB processor 826) and/or the controller 821 may execute the program. As described above, the eNB 800, the base station apparatus 820, or the module may be provided as an apparatus including the information acquisition unit 151 and the control unit 153, and the program causing the processor to function as the information acquisition unit 151 and the control unit 153 may be provided. A readable recording medium in which the program is recorded may be provided.

In addition, in the eNB 800 shown in FIG. 14, the wireless communication unit 120 described with reference to FIG. 8 may be implemented by the wireless communication interface 825 (for example, the RF circuit 827). Moreover, the antenna unit 110 may be implemented by the antenna 810. In addition, the network communication unit 130 may be implemented by the controller 821 and/or the network interface 823.

Second Application Example

Figure 15:
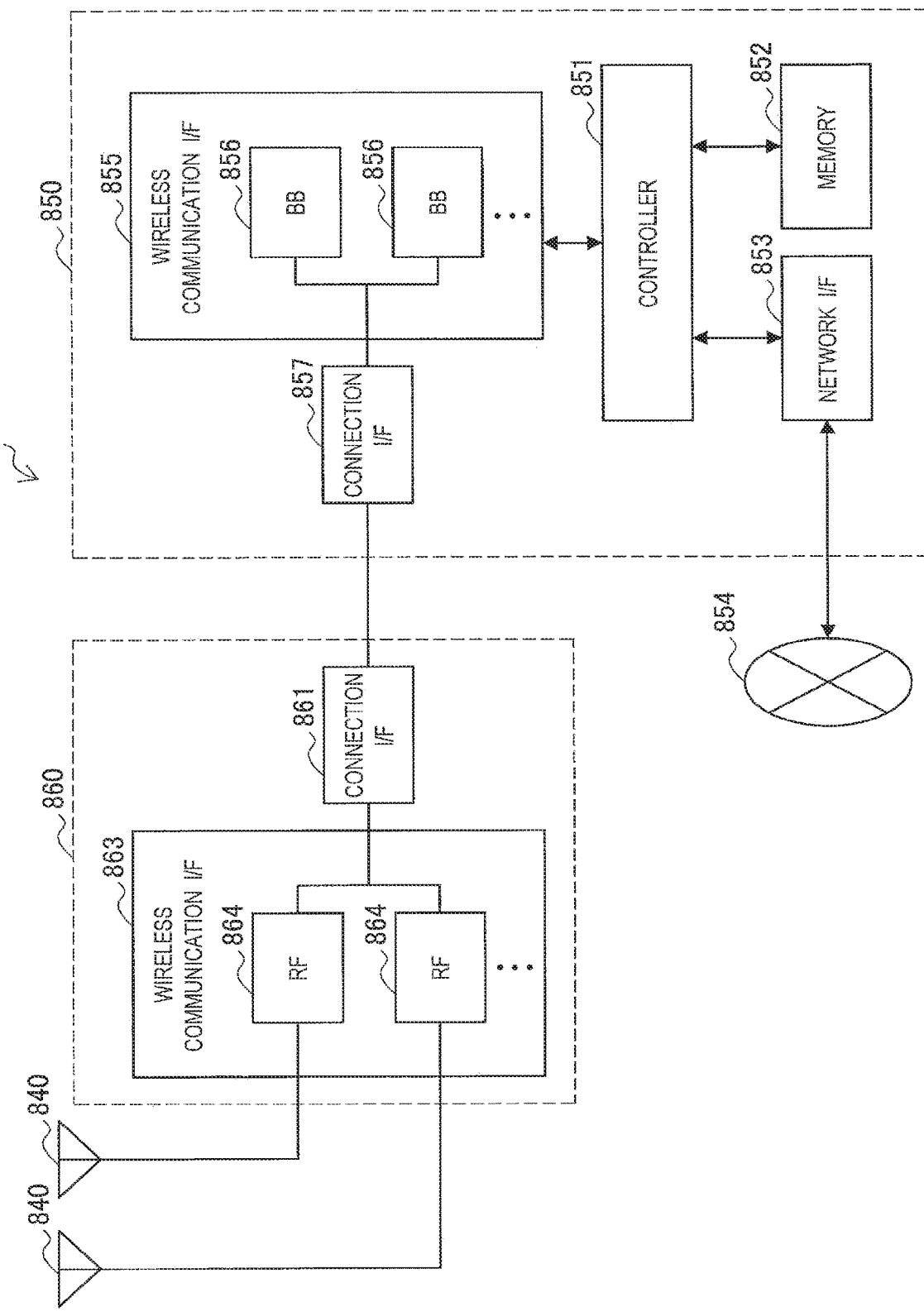
FIG. 15 is a block diagram illustrating a second example of the schematic configuration of the eNB.

FIG. 15 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. The base station apparatus 850 and the RRH 860 may be connected to each other by a high speed line such as optical fiber cables.

Each of the antennas 840 includes a single or a plurality of antenna elements (e.g. antenna elements constituting a MIMO antenna), and is used for the RRH 860 to transmit and receive a wireless signal. The eNB 830 may include a plurality of the antennas 840 as illustrated in FIG. 15, and the plurality of antennas 840 may, for example, correspond to a plurality of frequency bands used by the eNB 830. FIG. 15 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 14.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856. The BB processor 856 is the same as the BB processor 826 described with reference to FIG. 14 except that the BB processor 856 is connected to an RF circuit 864 of the RRH 860 via the connection interface 857. The wireless communication interface 855 may include a plurality of the BB processors 856, as illustrated in FIG. 15, and the plurality of BB processors 856 may, for example, correspond to a plurality of frequency bands used by the eNB 830 respectively. FIG. 15 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of the RF circuits 864 as illustrated in FIG. 15, and the plurality of RF circuits 864 may, for example, correspond to a plurality of antenna elements. FIG. 15 illustrates an example in which the wireless communication interface 863 includes the plurality of RF circuits 864, but the wireless communication interface 863 may include the single RF circuit 864.

In the eNB 830 illustrated in FIG. 15, the information acquisition unit 151 and the control unit 153 described above with reference to FIG. 8 may be mounted in the wireless communication interface 855 and the wireless communication interface 863. Alternatively, at least some of the components may be mounted in the controller 851. As an example, the eNB 830 may be equipped with a module including some or all components of the wireless communication interface 855 (for example, the BB processor 856) and/or the controller 851, and the information acquisition unit 151 and the control unit 153 may be mounted in the module. In this case, the module may store a program causing the processor to function as the information acquisition unit 151 and the control unit 153 (that is, a program causing the processor to perform the operation of the information acquisition unit 151 and the control unit 153) and execute the program. As another example, the program causing the processor to function as the information acquisition unit 151 and the control unit 153 may be installed in the eNB 830, and the wireless communication interface 855 (for example, the BB processor 856) and/or the controller 851 may execute the program. As described above, the eNB 830, the base station apparatus 850, or the module may be provided as an apparatus including the information acquisition unit 151 and the control unit 153, and the program causing the processor to function as the information acquisition unit 151 and the control unit 153 may be provided. A readable recording medium in which the program is recorded may be provided.

In addition, in the eNB 830 shown in FIG. 15, the wireless communication unit 120 described with reference to FIG. 8 may be implemented by the wireless communication interface 863 (for example, the RF circuit 864). Moreover, the antenna unit 110 may be implemented by the antenna 840. In addition, the network communication unit 130 may be implemented by the controller 851 and/or the network interface 853.

6.2. Application Examples for Terminal Apparatus

First Application Example

Figure 16:
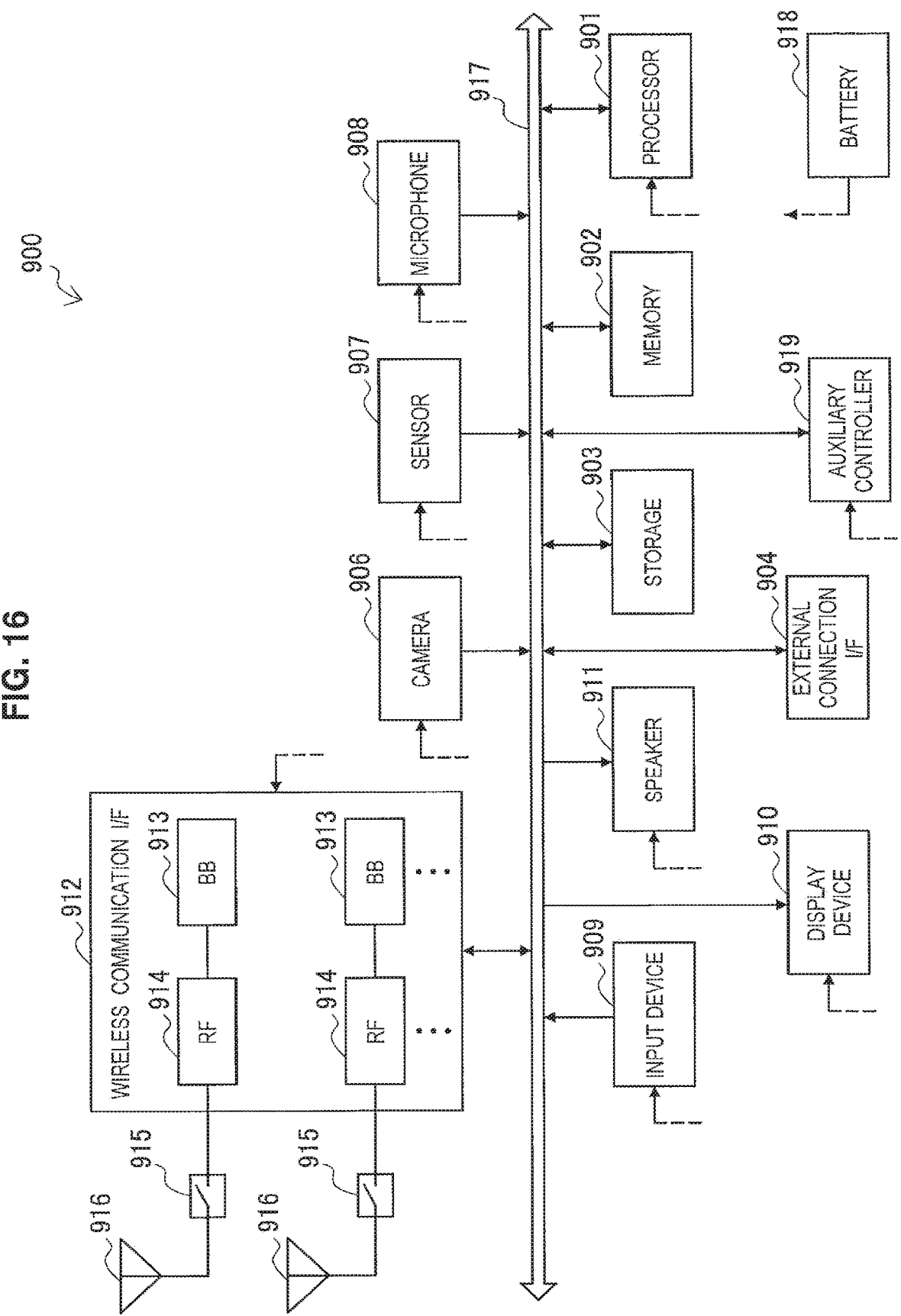
FIG. 16 is a block diagram illustrating an example of a schematic configuration of a smartphone.

FIG. 16 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and a secondary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 16. FIG. 16 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 16. FIG. 16 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the secondary controller 919 to each other. The battery 918 supplies electric power to each block of the smartphone 900 illustrated in FIG. 16 via a feeder line that is partially illustrated in the figure as a dashed line. The secondary controller 919, for example, operates a minimally necessary function of the smartphone 900 in a sleep mode.

In the smartphone 900 illustrated in FIG. 16, the interference amount calculation unit 241, the detection unit 243 and/or reporting unit 245 described above with reference to FIG. 9 may be mounted in the wireless communication interface 912. Alternatively, at least some of the components may be mounted in the processor 901 or the secondary controller 919. As an example, the smartphone 900 may be equipped with a module including some or all components of the wireless communication interface 912 (for example, the BB processor 913), the processor 901, and/or the secondary controller 919, and the interference amount calculation unit 241, the detection unit 243 and/or reporting unit 245 may be mounted in the module. In this case, the module may store a program causing the processor to function as the interference amount calculation unit 241, the detection unit 243 and/or reporting unit 245 (that is, a program causing the processor to perform the operation of the interference amount calculation unit 241, the detection unit 243 and/or reporting unit 245) and execute the program. As another example, the program causing the processor to function as the interference amount calculation unit 241, the detection unit 243 and/or reporting unit 245 may be installed in the smartphone 900, and the wireless communication interface 912 (for example, the BB processor 913), the processor 901, and/or the secondary controller 919 may execute the program. As described above, the smartphone 900 or the module may be provided as an apparatus including the interference amount calculation unit 241, the detection unit 243 and/or reporting unit 245, and the program causing the processor to function as the interference amount calculation unit 241, the detection unit 243 and/or reporting unit 245 may be provided. A readable recording medium in which the program is recorded may be provided.

In addition, in the smartphone 900 shown in FIG. 16, the wireless communication unit 220 described with reference to FIG. 9 may be implemented by the wireless communication interface 912 (for example, the RF circuit 914). Moreover, the antenna unit 210 may be implemented by the antenna 916.

Second Application Example

FIG. 17 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g. latitude, longitude, and altitude) of the car navigation apparatus 920. The sensor 925 may include a sensor group including, for example, a gyro sensor, a geomagnetic sensor, and a barometric sensor. The data interface 926 is, for example, connected to an in-vehicle network 941 via a terminal that is not illustrated, and acquires data such as vehicle speed data generated on the vehicle side.

The content player 927 reproduces content stored in a storage medium (e.g. CD or DVD) inserted into the storage medium interface 928. The input device 929 includes, for example, a touch sensor which detects that a screen of the display device 930 is touched, a button, or a switch, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 17. FIG. 17 illustrates an example in which the wireless communication interface 933 includes a plurality of BB processors 934 and a plurality of RF circuits 935, but the wireless communication interface 933 may be a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 includes a plurality of antennas 937 as illustrated in FIG. 17. FIG. 17 illustrates an example in which the car navigation apparatus 920 includes a plurality of antennas 937, but the car navigation apparatus 920 may include a single antenna 937.

Further, the smartphone 920 may include the antenna 937 for each wireless communication system. In this case, the antenna switch 936 may be omitted from a configuration of the car navigation apparatus 920.

The battery 950 supplies electric power to each block of the car navigation apparatus 930 illustrated in FIG. 17 via a feeder line that is partially illustrated in the figure as a dashed line. The battery 950 accumulates the electric power supplied from the vehicle.

In the car navigation apparatus 920 illustrated in FIG. 17, the interference amount calculation unit 241, the detection unit 243 and/or reporting unit 245 described above with reference to FIG. 9 may be mounted in the wireless communication interface 933. Alternatively, at least some of the components may be mounted in the processor 921. As an example, the car navigation apparatus 920 may be equipped with a module including some or all components of the wireless communication interface 933 (for example, the BB processor 934), and the interference amount calculation unit 241, the detection unit 243 and/or reporting unit 245 may be mounted in the module. In this case, the module may store a program causing the processor to function as the interference amount calculation unit 241, the detection unit 243 and/or reporting unit 245 (that is, a program causing the processor to perform the operation of the interference amount calculation unit 241, the detection unit 243 and/or reporting unit 245) and execute the program. As another example, the program causing the processor to function as the interference amount calculation unit 241, the detection unit 243 and/or reporting unit 245 may be installed in the car navigation apparatus 920, and the wireless communication interface 933 (for example, the BB processor 934) and/or the processor 921 may execute the program. As described above, the car navigation apparatus 920 or the module may be provided as an apparatus including the interference amount calculation unit 241, the detection unit 243 and/or reporting unit 245, and the program causing the processor to function as the interference amount calculation unit 241, the detection unit 243 and/or reporting unit 245 may be provided. A readable recording medium in which the program is recorded may be provided.

In addition, in the car navigation apparatus 920 shown in FIG. 17, the wireless communication unit 220 described with reference to FIG. 9 may be implemented by the wireless communication interface 933 (for example, the RF circuit 935). Moreover, the antenna unit 210 may be implemented by the antenna 937.

The technology of the present disclosure may also be realized as an in-vehicle system (or a vehicle) 940 including one or more blocks of the car navigation apparatus 920, the in-vehicle network 941, and a vehicle module 942. In other words, the in-vehicle system (or a vehicle) 940 may be provided as a device which includes the interference amount calculation unit 241, the detection unit 243 and/or reporting unit 245. The vehicle side module 942 generates vehicle data such as vehicle speed, engine speed, and trouble information, and outputs the generated data to the in-vehicle network 941.

7. Conclusion

Each apparatus and each process according to the embodiment of the present disclosure have been described above with reference to FIGS. 5 to 17.

According to the embodiment of the present disclosure, the base station 100 includes the information acquisition unit 151 that acquires information about a directional beam which is an interference source for the terminal apparatus 200 connected to the base station 300 (a neighbor base station of the base station 100), from among a plurality of directional beams which can be formed by the base station 100, the information being provided by the base station 300, and the control unit 153 that decides an operation of the base station 100 regarding transmission of a signal over the directional beam on the basis of the information.

Accordingly, it is possible to further decrease interference of a directional beam between cells, for example.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although an example is described in which the system is a system that is compliant with LTE, LTE-Advanced, or a communication scheme that conforms to them, the present disclosure is not limited to such an example. For example, the communication system may be a system that conforms to another communication standard.

Further, it is not always necessary to execute the processing steps in the processing in the present specification in chronological order in order described in the flowcharts or the sequence diagrams. For example, the processing steps in the above-described processing may be executed in order different from the order described in the flowcharts or the sequence diagrams or may be executed in parallel.

In addition, a computer program for causing a processor (for example, a CPU, a DSP, or the like) provided in a device of the present specification (for example, a base station, a base station apparatus or a module for a base station apparatus, or a terminal apparatus or a module for a terminal apparatus) to function as a constituent element of the device (for example, the information acquisition unit, the control unit, or the like) (in other words, a computer program for causing the processor to execute operations of the constituent element of the device) can also be created. In addition, a recording medium in which the computer program is recorded may also be provided. Further, a device that includes a memory in which the computer program is stored and one or more processors that can execute the computer program (a base station, a base station apparatus or a module for a base station apparatus, or a terminal apparatus or a module for a terminal apparatus) may also be provided. In addition, a method including an operation of the constituent element of the device (for example, the information acquisition unit, the communication control unit, or the like) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An apparatus including:

an acquisition unit that acquires information about a directional beam that is provided from a neighbor base station of a base station, the directional beam serving as an interference source for a terminal apparatus connected to the neighbor base station among a plurality of directional beams which is able to be formed by the base station; and a control unit that decides an operation of the base station regarding transmission of a signal over the directional beam on the basis of the information.

(2)

The apparatus according to (1), in which the signal includes a data signal.

(3)

The apparatus according to (1) or (2), in which the signal includes a reference signal for channel quality measurement.

(4)

The apparatus according to (3), in which the reference signal for channel quality measurement is a channel state information reference signal (CSI-RS).

(5)

The apparatus according to any one of (1) to (4), in which the control unit decides suspension of transmission of the signal over the directional beam as the operation.

(6)

The apparatus according to any one of (1) to (5), in which the control unit decides restriction on transmission of the signal over the directional beam as the operation.

(7)

The apparatus according to (6), in which the restriction includes restriction on a radio resource in which a data signal is transmitted over the directional beam.

(8)

The apparatus according to (7), in which the restriction includes restriction on a time resource in which a data signal is transmitted over the directional beam.

(9)

The apparatus according to any one of (6) to (8), in which the restriction includes lengthening a period of transmission of a reference signal for channel quality measurement over the directional beam.

(10)

The apparatus according to any one of (1) to (9), in which the control unit notifies the neighbor base station of the operation of the base station.

(11)
The apparatus according to any one of (1) to (10),
in which the control unit notifies a terminal apparatus of the operation of the base station.
(12)
The apparatus according to any one of (1) to (11),
in which the information about the directional beam includes information for specifying the directional beam.
(13)
The apparatus according to any one of (1) to (12),
in which the control unit cancels the operation of the base station in the case where a cancellation condition is satisfied.
(14)
The apparatus according to (13),
in which the cancellation condition includes a condition that an elapsed time from initiation of the operation exceeds a predetermined time.
(15)
The apparatus according to (13) or (14),
in which the cancellation condition includes reception, by the base station, of cancellation information about cancellation of the operation from the neighbor base station.
(16)
The apparatus according to (15),
in which the cancellation information includes restriction information indicating restriction on transmission of the signal over the directional beam after cancellation.
(17)
The apparatus according to (16),
in which the restriction information indicates, as the restriction, a radio resource or a period in which the signal is transmitted over the directional beam, or
a configuration of a reference signal for channel quality measurement transmitted over the directional beam.
(18)
The apparatus according to any one of (1) to (17),
in which the apparatus is the base station, a base station apparatus for the base station, or a module for the base station apparatus.
(19)
A method including, by a processor:
acquiring information about a directional beam that is provided from a neighbor base station of a base station, the directional beam serving as an interference source for a terminal apparatus connected to the neighbor base station among a plurality of directional beams which is able to be formed by the base station; and
deciding an operation of the base station regarding transmission of a signal over the directional beam on the basis of the information.
(20)
An apparatus including:
a calculation unit that calculates an amount of interference from a reference signal for channel quality measurement transmitted by a neighbor base station of a serving base station;
a detection unit that detects a radio resource having a small amount of interference from among radio resources to which the reference signal is transmitted; and
a reporting unit that reports the radio resource having a small amount of interference to a base station.
(21)
A program causing a processor to execute:
acquiring information about a directional beam that is provided from a neighbor base station of a base station, the directional beam serving as an interference source for a terminal apparatus connected to the neighbor base station among a plurality of directional beams which is able to be formed by the base station; and
deciding an operation of the base station regarding transmission of a signal over the directional beam on the basis of the information.
(22)
A readable recording medium having a program stored therein, the program causing a processor to execute:
acquiring information about a directional beam that is provided from a neighbor base station of a base station, the directional beam serving as an interference source for a terminal apparatus connected to the neighbor base station among a plurality of directional beams which is able to be formed by the base station; and
deciding an operation of the base station regarding transmission of a signal over the directional beam on the basis of the information.
(23)
A method including, by a processor:
calculating an amount of interference from a reference signal for channel quality measurement transmitted by a neighbor base station of a serving base station;
detecting a radio resource having a small amount of interference from among radio resources to which the reference signal is transmitted; and
reporting the radio resource having a small amount of interference to a base station.
(24)
A program causing a processor to execute:
calculating an amount of interference from a reference signal for channel quality measurement transmitted by a neighbor base station of a serving base station;
detecting a radio resource having a small amount of interference from among radio resources to which the reference signal is transmitted; and
reporting the radio resource having a small amount of interference to a base station.
(25)
A readable recording medium having a program stored therein, the program causing a processor to execute:
calculating an amount of interference from a reference signal for channel quality measurement transmitted by a neighbor base station of a serving base station;
detecting a radio resource having a small amount of interference from among radio resources to which the reference signal is transmitted; and
reporting the radio resource having a small amount of interference to a base station.

REFERENCE SIGNS LIST 1 system
100 base station
101 cell
151 information acquisition unit
153 control unit
200 terminal apparatus
241 interference calculation unit
243 detection unit
245 reporting unit
300 base station
301 cell

The invention claimed is:
1. A base station in a wireless communication network, the base station comprising:
circuitry configured to transmit, to a user device via a directional beam, reference signaling for a channel quality measurement by the user device;

receive, from a neighboring base station, first information identifying that the directional beam is an interference source for the user device, the user device being connected to the neighboring base station;

based on the first information, suspend resources related to the channel quality measurement;

transmit to the user device a notification that the resources are suspended;

based on a predetermined condition, transmit to the user device a notification that the resources are reactivated; and based on the reactivated resources, receive from the user device, information related to a current channel quality measurement.

2. The base station of claim 1, wherein
the predetermined condition corresponds to when a time that the resources are suspended exceeds a predetermined period of time.

3. The base station of claim 1, wherein
the predetermined condition corresponds to receipt of information about reactivating the suspended resources from a neighbor base station.

4. A method performed by a base station, the method comprising:

transmitting, to a user device, reference signaling for a channel quality measurement by the user device;

receiving, from a neighboring base station, first information identifying that a directional beam of the base station is an interference source for the user device, the user device being connected to the neighboring base station;

based on the first information, suspending resources related to the channel quality measurement;

transmitting to the user device a notification that the resources are suspended;

based on a predetermined condition, transmitting to the user device a notification that the resources are reactivated; and based on the reactivated resources, receiving from the user device, information related to a current channel quality measurement.

5. A non-transitory computer-readable medium including computer-program instructions, which when executed by a base station, cause the base station to:

transmit, to a user device via a directional beam, reference signaling for a channel quality measurement by the user device;

receive, from a neighboring base station, first information identifying that the directional beam is an interference source for the user device, the user device being connected to the neighboring base station;

based on the first information, suspend resources related to the channel quality measurement;

transmit to the user device a notification that the resources are suspended;

based on a predetermined condition, transmit to the user device a notification that the resources are reactivated; and based on the reactivated resources, receive from the user device, information related to a current channel quality measurement.

* * * * *